US012688420B2

(12) United States Patent
    Baldi et al.

(10) Patent No.: US 12,688,420 B2
(45) Date of Patent: Jul. 21, 2026

(54) METHOD FOR CLASSIFYING THE MANOEUVRES PERFORMED BY AN AIRCRAFT BY SEGMENTATION OF TIME SERIES OF MEASUREMENTS ACQUIRED DURING A FLIGHT OF THE AIRCRAFT

(71) Applicant: LEONARDO S.P.A., Rome (IT)

(72) Inventors: Andrea Baldi, Samarate (IT); Ugo Mariani, Samarate (IT); Daniele Mezzanzanica, Samarate (IT); Mara Tanelli, Milan (IT); Eugenia Villa, Milan (IT); Francesco Zinnari, Milan (IT); Giovanni Coral, Milan (IT); Francesco Braghin, Milan (IT); Gabriele Cazzulani, Milan (IT)

(73) Assignee: LEONARDO S.P.A., Rome (IT)

( * ) Notice: Subject to any disclaimer, the term of this patent is extended or adjusted under 35 U.S.C. 154(b) by 100 days.

(21) Appl. No.: 18/716,392

(22) PCT Filed: Nov. 16, 2022

(86) PCT No.: PCT/IB2022/061023
    § 371 (c)(1),
    (2) Date: Jun. 4, 2024

(87) PCT Pub. No.: WO2023/111716
    PCT Pub. Date: Jun. 22, 2023

(65) Prior Publication Data
    US 2025/0036942 A1    Jan. 30, 2025

(30) Foreign Application Priority Data
    Dec. 17, 2021    (EP) .................................... 21215745

(51) Int. Cl.
    *G06N 3/08*    (2023.01)

(52) U.S. Cl.
    CPC ..................................... *G06N 3/08* (2013.01)

(58) Field of Classification Search
    CPC ........ G06N 3/08; G06N 3/048; G06N 3/0455; G06N 3/0464; G06N 3/09; G06N 3/047;
    (Continued)

(56) References Cited

U.S. PATENT DOCUMENTS

| | | | |
|---|---|---|---|
| 10,935,938 B1 | 3/2021 | Bertram et al. | |
| 2022/0076583 A1* | 3/2022 | Gu ....................... | G08G 5/0047 |
| 2022/0390964 A1* | 12/2022 | Youmans ............... | G05D 1/104 |

FOREIGN PATENT DOCUMENTS

| | | | | |
|---|---|---|---|---|
| CN | 109508812 A | * | 3/2019 | ............. G06N 3/045 |
| CN | 112784487 A | * | 5/2021 | ............. G06F 17/12 |

(Continued)

OTHER PUBLICATIONS

J. Qu, M. Lv, Y. Yang and Y. Tang, "Flight Motion Recognition Method Based on Multivariate Phase Space Reconstruction and Approximate Entropy," 2021 40th Chinese Control Conference (CCC), Shanghai, China, 2021, pp. 7247-7253, doi: 10.23919/CCC52363.2021.9550605. (Year: 2021).*

(Continued)

*Primary Examiner* — Russell Frejd
*Assistant Examiner* — Brittany Renee Peko
(74) *Attorney, Agent, or Firm* — Leason Ellis LLP

(57) ABSTRACT

A computer-implemented method for classifying manoeuvres performed by an aircraft, including: acquiring a data structure including at least one unknown data matrix including a plurality of time series of samples of quantities related to the flight of the aircraft, the samples being relative to a succession of instants of time; applying to the unknown data matrix a neural network generating a corresponding probability matrix including, for each instant of time of the succession of instants of time, a corresponding probability (Continued)

vector including, for each class of a plurality of classes of manoeuvres, a corresponding estimate of the probability that, in the instant of time, the aircraft has performed a manoeuvre belonging to the class; and selecting, for each instant of time of the succession of instants of time, a corresponding class of manoeuvres, based on the probability estimates of the corresponding probability vector.

16 Claims, 19 Drawing Sheets

(58) Field of Classification Search
CPC ...... G05B 23/0283; G05B 2219/45071; G05B 23/024
See application file for complete search history.

(56) References Cited

FOREIGN PATENT DOCUMENTS

| EP | 2270618 A2 | 1/2011 |
| EP | 2725337 A1 | 4/2014 |
| EP | 4016221 B1 | 6/2022 |

OTHER PUBLICATIONS

B. Wang, X. Peng and D. Liu, "Airborne Sensor Data-Based Unsupervised Recursive Identification for UAV Flight Phases," in IEEE Sensors Journal, vol. 20, No. 18, pp. 10733-10743, 15 Sep. 15, 2020, doi: 10.1109/JSEN.2020.2994589. (Year: 2020).*
International Search Report and Written Opinion in PCT Application No. PCT/IB2022/061023, mailed Jan. 30, 2023 (10 pages).

* cited by examiner

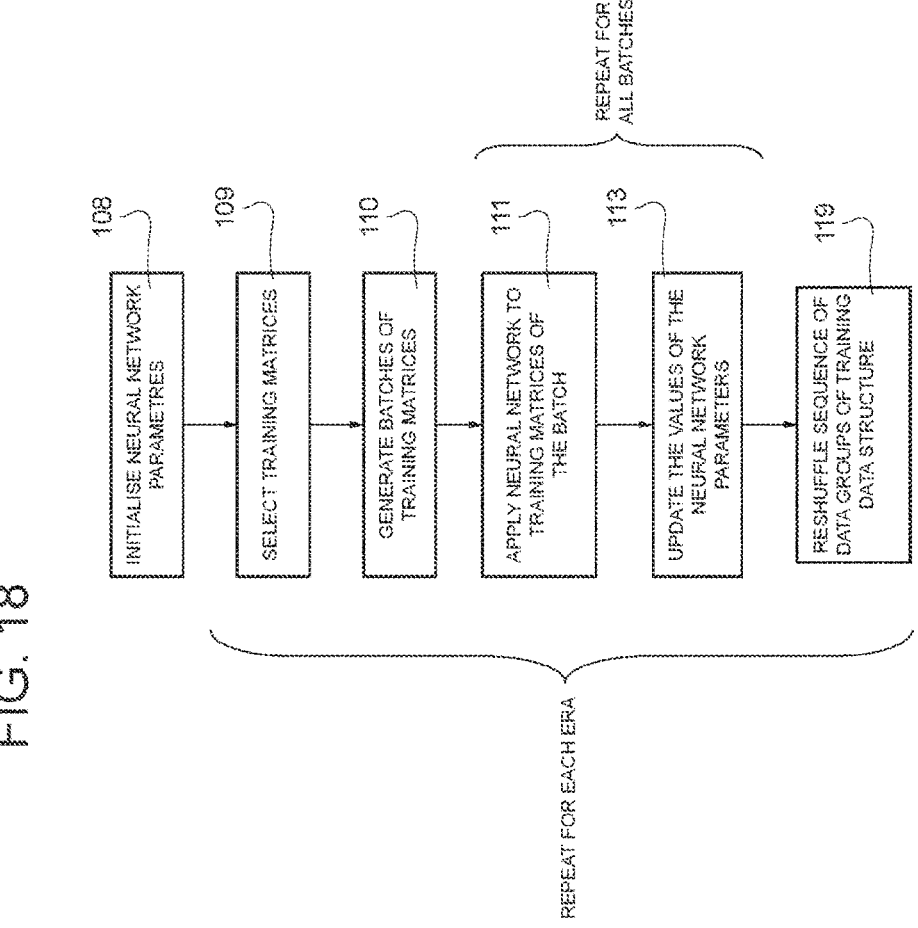

FIG. 18

108 INITIALISE NEURAL NETWORK PARAMETRES

109 SELECT TRAINING MATRICES

110 GENERATE BATCHES OF TRAINING MATRICES

111 APPLY NEURAL NETWORK TO TRAINING MATRICES OF THE BATCH

113 UPDATE THE VALUES OF THE NEURAL NETWORK PARAMETERS

119 RESHUFFLE SEQUENCE OF DATA GROUPS OF TRAINING DATA STRUCTURE

REPEAT FOR ALL BATCHES

REPEAT FOR EACH ERA

FIG. 3

100 ACQUIRE TRAINING DATA STRUCTURE

106 TRAIN NEURAL NETWORK

120 ACQUIRE UNKNOW DATA STRUCTURE

121 SELECT UNKNOW STRUCTURE

122 APPLY NEURAL NETWORK TO UNKNOW MANOEUVRES

123 DETECT CLASSES OF UNKNOWN MANOEUVRES

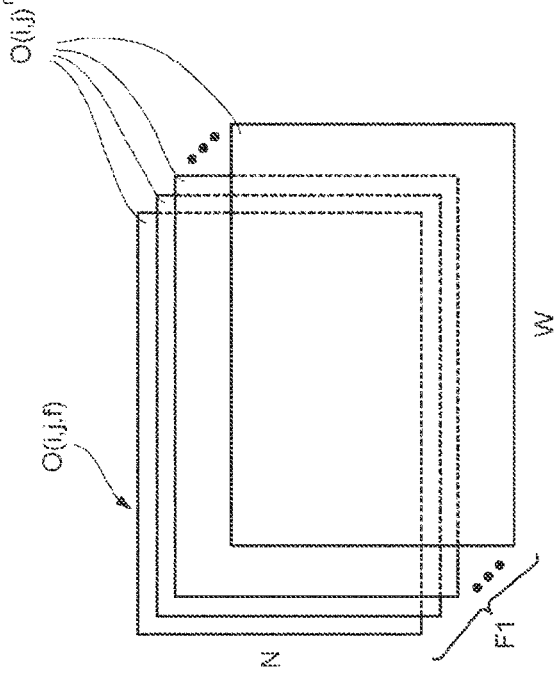
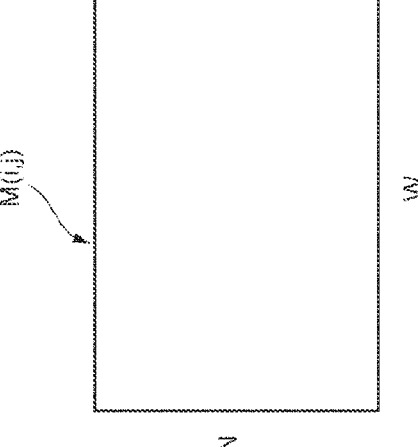
FIG. 8

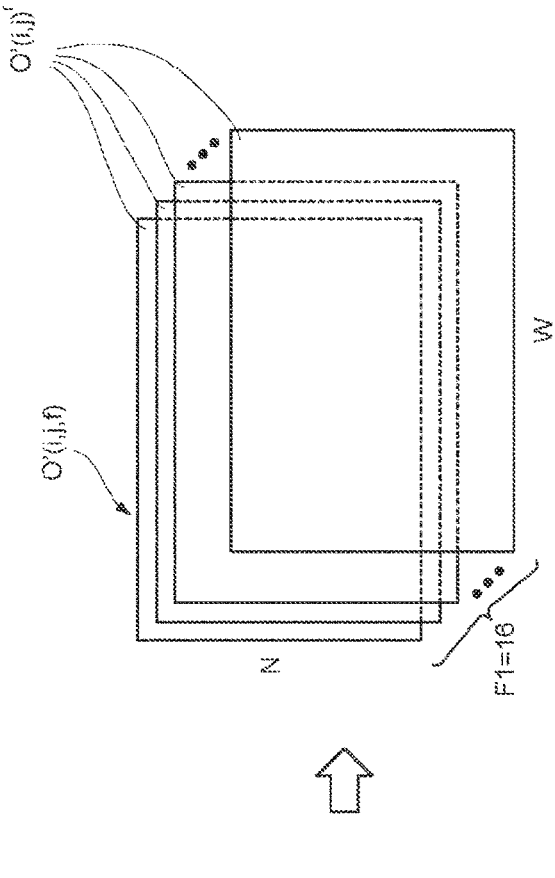
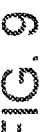
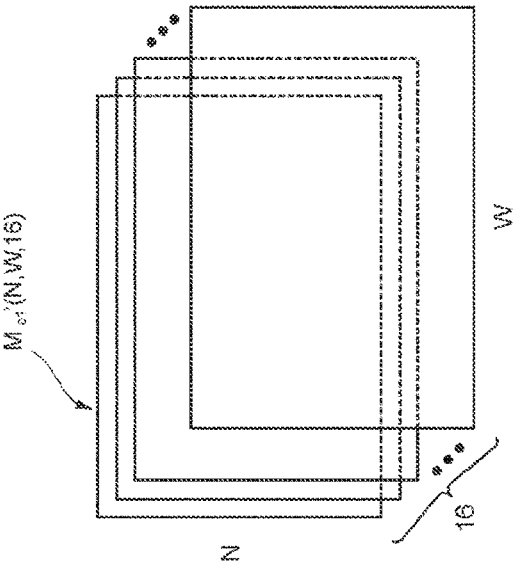
FIG. 9

1

METHOD FOR CLASSIFYING THE MANOEUVRES PERFORMED BY AN AIRCRAFT BY SEGMENTATION OF TIME SERIES OF MEASUREMENTS ACQUIRED DURING A FLIGHT OF THE AIRCRAFT

CROSS-REFERENCE TO RELATED APPLICATIONS

This Patent Application is a U.S. National Phase Application under 35 U.S.C. § 371 of International Patent Application No. PCT/IB2022/061023, filed on Nov. 16, 2022, which claims priority from European Patent Application No. 21215745.7, filed on Dec. 17, 2021, all of which are incorporated by reference as if expressly set forth in their respective entireties herein.

TECHNICAL FIELD

The present invention relates to a method for classifying the manoeuvres performed by an aircraft, by segmentation of time series of measurements acquired during a flight of the aircraft.

BACKGROUND

As is known, in aeronautics the need to monitor the state of fatigue, and more generally the state of health, of the components of an aircraft is particularly felt, for example in order to be able to accurately estimate the residual life time of each component, and therefore to optimise maintenance activities, without compromising flight safety.

In particular, it is known that the state of fatigue to which the components of an aircraft are subjected depends on the manoeuvres to which, during usage, the aircraft has been subjected, since the loads to which each component is subjected depend on the manoeuvres performed by the aircraft. Consequently, the need is felt to correctly identify the manoeuvres performed by an aircraft, so that the so-called "real usage spectrum" can then be determined. To this end, it is known to equip aircrafts with monitoring systems adapted to measure flight-related quantities, i.e. adapted to acquire values (samples) of these quantities; this allows a large number of measurements of these quantities to be acquired, which can then be analysed to study the history of the manoeuvres performed by the aircraft.

For example, FIG. 1A shows a helicopter 1, which is equipped with a monitoring system 2, which includes sensors adapted to measure corresponding quantities, which are referred to in the following as the primary quantities. Generally, the samples of the primary quantities are acquired with a certain sampling frequency, typically in the order of about ten Hertz. Purely by way of example, the primary quantities may include: variables related to the aircraft kinematics (such as, for example, pitch angle, roll angle, yaw angle, track angle, vertical acceleration, vertical speed, longitudinal acceleration, lateral acceleration, roll rate, pitch rate, yaw rate, northbound speed, eastbound speed, main rotor speed); variables related to the aircraft controls (such as, for example, collective control position, lateral position cyclic control, longitudinal position cyclic control, pedal position); environmental variables (such as, for example, air speed, radar altitude, barometric altitude, wind speed, wind direction, total air temperature, take-off weight); variables related to the energy systems (such as, for example, the torque of the motors, the rotation speed of the engine turbines, the rotation speed of the engine generators).

For example, FIG. 1B shows the trends over time of five primary quantities (denoted as quantities 1-5, respectively), which are monitored by corresponding sensors of the monitoring system 2 during a test flight. The sensors in the monitoring system 2 periodically provide the corresponding samples and operate, for example, synchronously and without phase shift, with the same sampling frequency $f_c$ (e.g. equal to 12.5 Hz).

However, the Applicant has observed that, even having such measurements, the correct detection of the executed manoeuvres requires the execution of advanced data processing techniques and is also hampered by the fact that different manoeuvres typically have different durations, which complicates the analysis of the aforementioned time trends.

In order to overcome the problem of the different manoeuvre durations, European patent application No. 20425059.1, filed on 18 Dec. 2020 on behalf of the Applicant, describes a computer-implemented method for detecting the execution, by an aircraft, of a manoeuvre belonging to a macrocategory among a plurality of predetermined macrocategories. In particular, as shown in FIG. 2, the set (denoted with 5) of the manoeuvres that can be carried out by an aircraft can be subdivided into a plurality of subsets, to which in the continuation reference is made precisely as to macrocategories (denoted with MC). Each macrocategory MC groups together subclasses of manoeuvres with similar features. For example, FIG. 2 shows macrocategories MC relating to level flight, bank turn, vertical take-off, climbing, etc., respectively. In turn, the macrocategory relating to level flight may include a plurality of manoeuvres (only four shown in FIG. 2, denoted with "level flight at forty knots", "level flight at sixty knots", "level flight at ninety knots" and "level flight at one hundred and fifty knots"). In other words, each macrocategory MC represents a corresponding class of manoeuvres, i.e. a corresponding flight regime.

That being said, the method described in European Patent Application No. 20425059.1 contemplates acquiring a data structure including a plurality of time series of values of quantities relating to a flight of the aircraft, and then performing, for each instant of time of a succession of instants of time, the steps of: for each time duration among a plurality of predetermined time durations, selecting a corresponding subset of the data structure having a time extent equal to the time duration and centred as a function of the instant of time; from each selected subset of the data structure, extracting a corresponding feature vector; based on the feature vectors, generating a corresponding input macrovector, alternatively by aggregation of the feature vectors or by performing classifications of the feature vectors, in order to generate input prediction vectors (each of which is indicative, for each macrocategory, of a corresponding probability that, in said instant of time of the succession of instants of time, the aircraft was performing a manoeuvre belonging to said macrocategory) and subsequent aggregation of the input prediction vectors. The method also contemplates performing, for each instant of time of the succession of instants of time, the steps of: applying to the input macrovector an output classifier, which is configured to generate a corresponding output vector including, for each macrocategory, a corresponding estimate of the probability that, in the aforementioned instant of time of the succession of instants of time, the aircraft was performing a manoeuvre belonging to this macrocategory; based on the output vector, detecting the macrocategory to which the manoeuvre performed by the aircraft in the aforementioned instant of time of the succession of instants of time belongs.

In more detail, the method described in the above-mentioned European patent application No. 20425059.1 requires the training of a plurality of classifiers in a supervised manner. Such training requires the provision of a training data structure that stores the time series (understood as successions of samples associated with corresponding instants of time) formed by the values of the primary quantities detected by helicopter monitoring systems during the test flights; in addition, it is necessary for pilots to label the test manoeuvres performed during the test flights, so that the training data structure stores, for each test manoeuvre, the macrocategory to which the test manoeuvre belongs. In this way, the training data structure is formed by a plurality of portions, referred to as data groups, each of which is associated with a corresponding macrocategory; furthermore, these portions may possibly be interspersed with portions referring to unlabelled periods of time, i.e. periods of time in which pilots have not reported performing manoeuvres. For example, FIG. 1B show a first and a second interval of time T1, T2, in which respectively a first and a second test manoeuvre M1, M2 of a test flight of the helicopter 1 are verified, which are reported by the pilot, belong to corresponding macrocategories (possibly, to a same macrocategory) and correspond to the data groups denoted respectively with DG1 and DG2; furthermore, in FIG. 1B three periods of time are denoted respectively with NMP1, NMP2, NMP3, which are interspersed with respect to the first and second interval of time T1, T2, in which no manoeuvres are reported by the pilot; in other words, the periods of time NMP1, NMP2, NMP3 are unlabelled periods.

The training of the classifiers is then carried out in a supervised manner based on the training data structure and is a function of the macrocategories reported by the pilots during the test flights (also known as load survey flights). The method described in the above-mentioned European patent application No 204250591 thus makes it possible to detect the macrocategories to which the manoeuvres performed by an aircraft belong with high precision, but it is based on the above-mentioned extraction of features, which must be carefully chosen in order to optimise the precision with which the macrocategories are detected. Moreover, the above-mentioned method is characterised by a rather high computational burden. In addition, the above-mentioned method requires defining the number and dimension of the above-mentioned time durations (also known as time windows).

U.S. Pat. No. 10,935,938 B1 discloses a system for learning practical autonomy including a module comprising a machine learning module configured to perform the steps of: receiving inputs, which include operator response data, and generating an output that tracks or trains against the one or more inputs, the output including one or more control system commands; and classifying a state based on a representation that correlates the operator response data to the state; and evaluating one or more manoeuvres responsive to the state to generate an evaluation gradient.

EP 2270618 A2 discloses a method for fault determination for an aircraft, which includes the steps of generating a predicted manoeuvre of the aircraft using aircraft operating input and a model of aircraft performance, determining an actual manoeuvre of the aircraft using information obtained from an inertial measurement system, comparing the predicted manoeuvre and the actual manoeuvre, and determining a fault of the aircraft based on the comparison of the predicted manoeuvre and the actual manoeuvre.

EP 2725337 A1 discloses a fatigue management system, wherein load classification flight parameters are correlated by means of a collection of heuristic models to associate said load flight via classification parameters the respective causative operational conditions collected during classification flights to the corresponding load data from at least one precedent load classification flight.

SUMMARY

Aim of the present invention is thus to provide a method for classifying the manoeuvres performed by an aircraft, which at least partially overcomes the drawbacks of the prior art.

According to the present invention, a method and a system for classifying manoeuvres are realized, as defined in the appended claims.

BRIEF DESCRIPTION OF THE DRAWINGS

To better understand the present invention preferred embodiments thereof will be now described, for merely exemplary and non-limiting purposes, with reference to the appended drawings, wherein:

FIGS. 3 and 18 show flow diagrams of operations according to the present method;

FIGS. 8, 9, 17 and 22 schematically show further data structures according to the present method;

DESCRIPTION OF EMBODIMENTS

Purely by way of example, the present method is now described on the assumption that the monitoring system 2 is adapted to acquire the samples relating to a number N of primary quantities. Furthermore, it is assumed that the macrocategories, which are referred to as classes in the following, are equal to NUM_C in number.

Figure 1A:
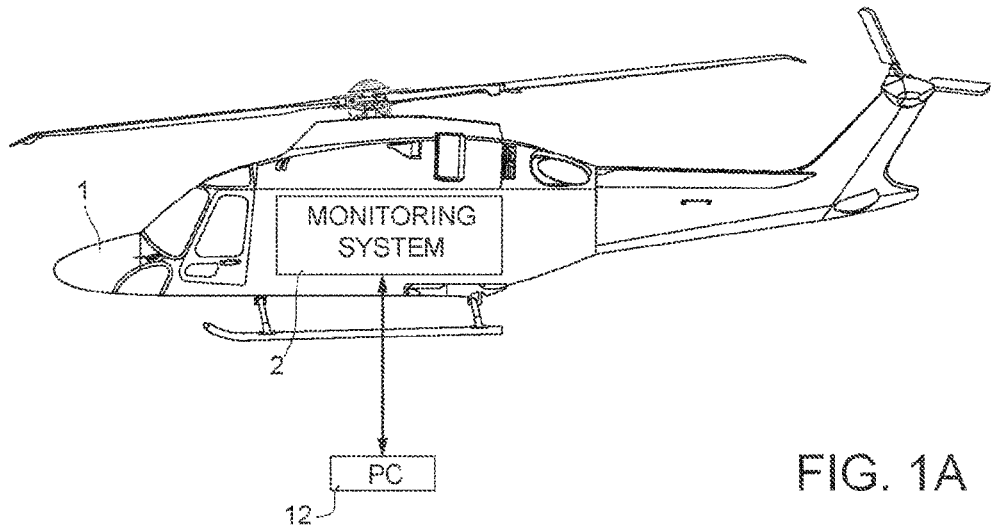
FIG. 1A schematically shows a view of an aircraft equipped with a monitoring system.
Figure 2:
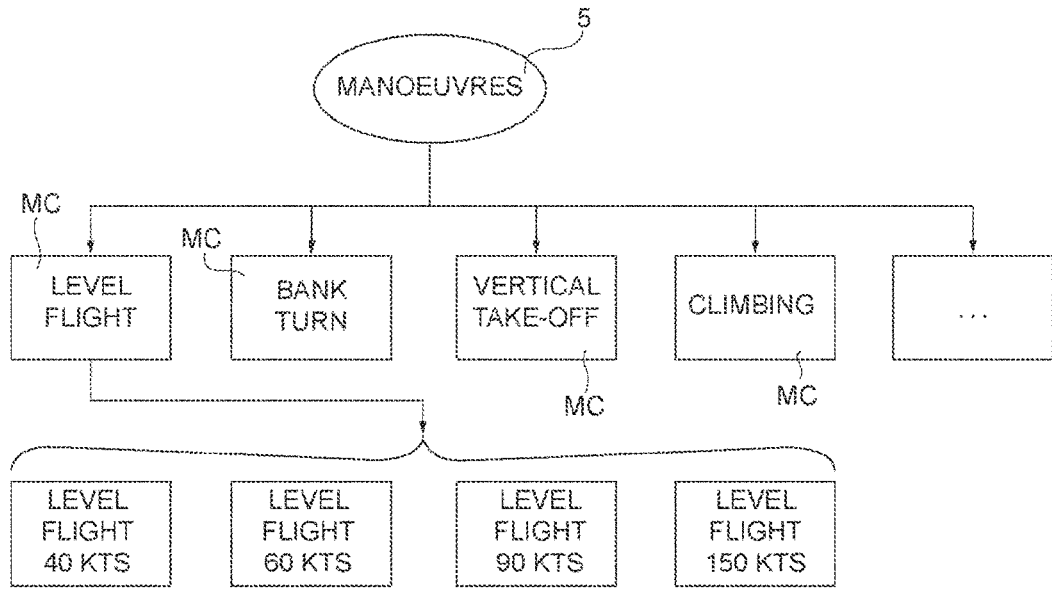
FIG. 2 shows a block diagram which exemplifies a possible subdivision into macrocategories of a set of manoeuvres that can be performed by an aircraft.
Figure 1B:
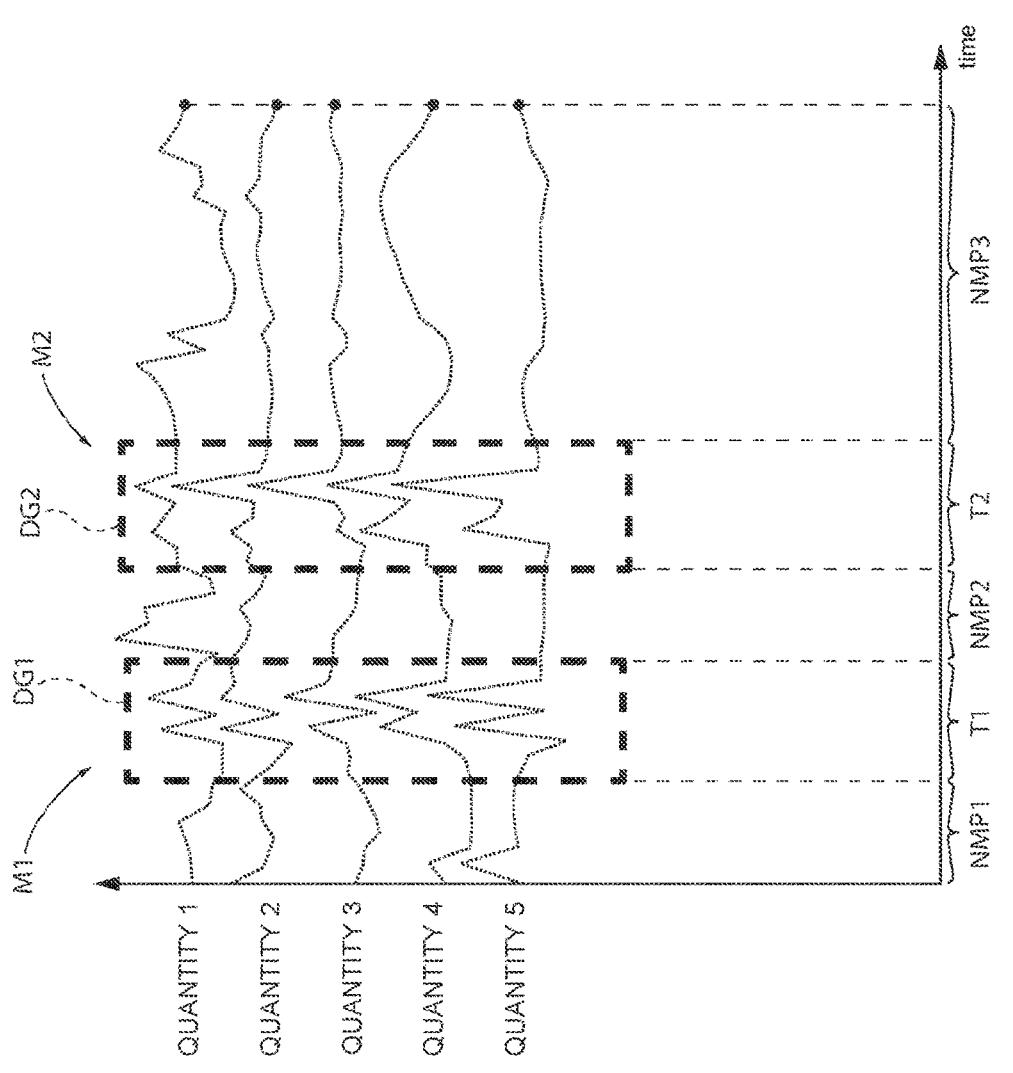
FIG. 1B shows examples of trends over time of values of quantities acquired by means of the monitoring system shown in FIG. 1A.
Figures 4, 5:
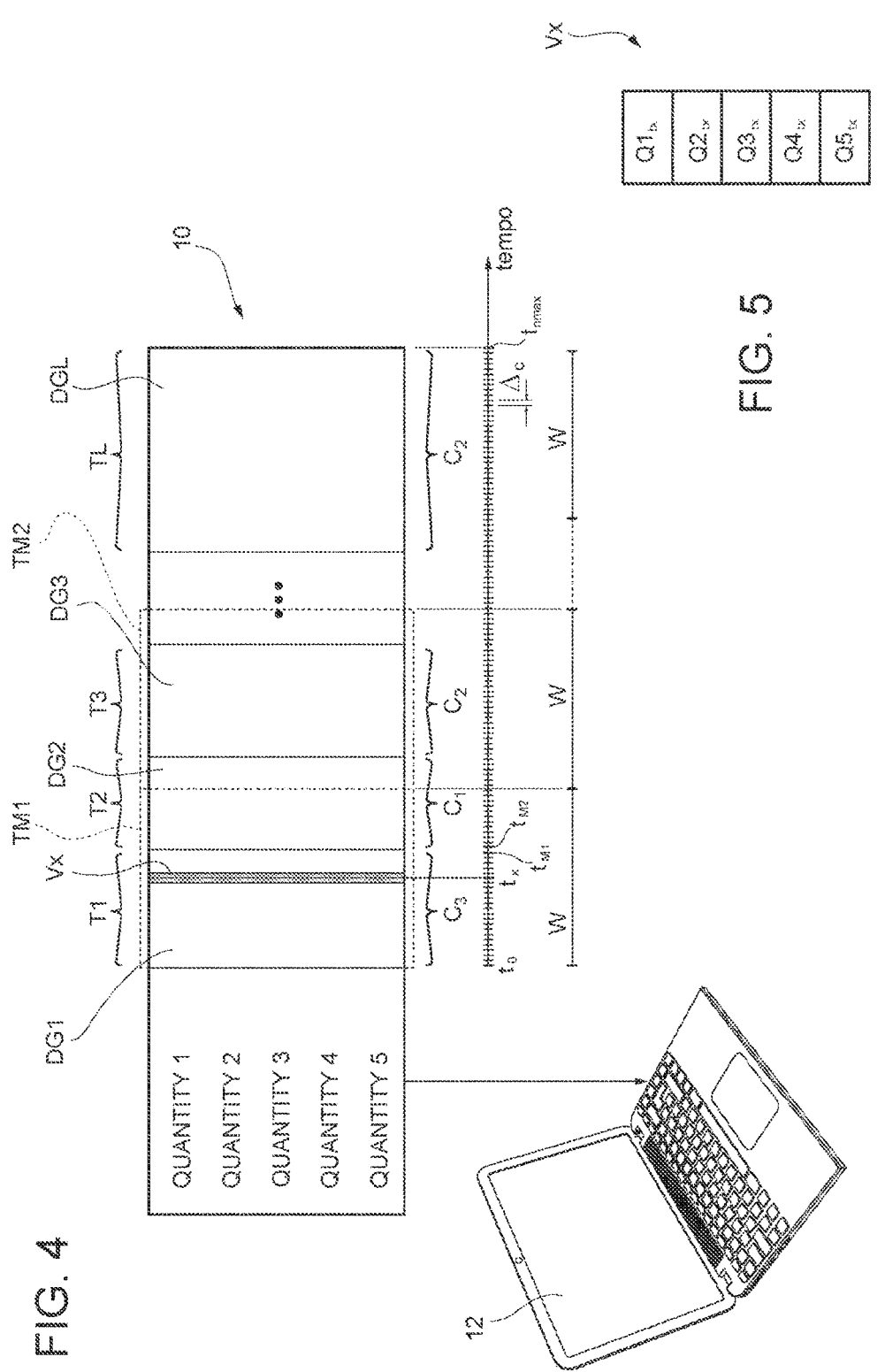
FIGS. 4, 20 and 21 schematically show data structures according to the present method.
FIG. 5 shows a block diagram of a portion of the data structure shown in FIG. 4.

In consideration of the foregoing, the present method provides, as shown in FIG. 3, acquiring (block 100) a training data structure 10, an example of which is qualitatively shown in FIG. 4, where it has been assumed for simplicity's sake that the number N of quantities primary is equal to five. As shown again in FIG. 4, the training data structure 10 can be stored in a computer 12.

In detail, the training data structure 10 stores the time series (understood as successions of samples associated with corresponding instants of time) formed by the samples of the primary quantities detected by the monitoring system 2 of the helicopter 1 during test flights, i.e. flights for which the manoeuvres performed are known. Furthermore, the training data structure 10 may also store time series formed by samples of the primary quantities acquired by monitoring systems (not shown) of several aircrafts (not shown and for example identical to each other) during respective test flights. However, in the following it is assumed for simplicity's sake that the training data structure 10 includes only samples of the primary quantities detected by the monitoring system 2 of the helicopter 1 during the execution of manoeuvres, carried out during the test flights.

In more detail, and without any loss of generality, the training data structure 10 stores samples relating to instants of time when manoeuvres are performed; in other words, the training data structure 10 stores samples of the primary quantities relating to labelled periods.

In practice, the training data structure 10 stores, for each manoeuvre performed during a test flight (referred to briefly in the following as the test manoeuvre), a corresponding data group (denoted with DG), which is formed by the samples of the primary quantities acquired by the monitoring system 2 during the interval of time in which the test manoeuvre was performed by the helicopter 1. In addition, for each test manoeuvre, the detection data structure 10 stores the class to which the test manoeuvre belongs.

For example, in FIG. 4 it is assumed that the training data structure 10 refers to a number L of test manoeuvres; in particular, with regard to the 1-th test manoeuvre (with 1=1, . . . , L), the training data structure 10 stores a corresponding 1-th data group DG1, as well as the association with the corresponding class. For example, in FIG. 4 it was assumed that the first three test manoeuvres, which took place in the intervals of time T1, T2 and T3, belong to the classes $C_3$, $C_1$ and $C_2$, respectively; furthermore, it was assumed that the L-th test manoeuvre, which took place in the interval of time TL, belongs to class $C_2$.

Even in greater detail, the time series of samples of the primary quantities stored in the training data structure 10 refer to a succession of instants of time, which in FIG. 4 extends between a first instant of time $t_0$ and a last instant of time $t_{nmax}$. Furthermore, considering each data group of the training data structure 10, and thus considering each test manoeuvre, the corresponding portions of the time series of samples of the primary quantities refer to a corresponding succession of instants of time, which are temporally spaced by a time step denoted with $\Delta_c$ and equal to the inverse of the sampling frequency $f_c$. Furthermore, considering, for example, the first and second data groups DG1, DG2 of the training data structure 10, the last instant of time of the first data group DG1 (denoted with $t_{M1}$) and the first instant of time of the second data group DG2 (denoted with $t_{M2}$) may have a time distance different from $\Delta_c$, since, as explained above, the first and the second test manoeuvres M1, M2 may have been performed after some time, rather than immediately one after the other. Similar considerations apply to each pair of adjacent data groups in the training data structure 10. From another point of view, the axis of the time shown in FIG. 4 is formed by a succession of instants of time, not necessarily equally spaced between them.

In practice, for each instant of time, the training data structure 10 stores a corresponding training vector including, for each of the primary quantities, the corresponding sample. In this regard, FIG. 4 shows, by way of example, the training vector (denoted with Vx) relative to the instant of time $t_x$, which falls within the interval of time T1 and stores the corresponding samples of the primary quantities 1-5, denoted respectively with $Q1_{tx}$-$Q5_{tx}$ (visible in FIG. 5). The training data structure 10 is therefore a two-dimensional matrix of dimensions N*(nmax+1), in which each column consists of a corresponding training vector.

Figure 6:
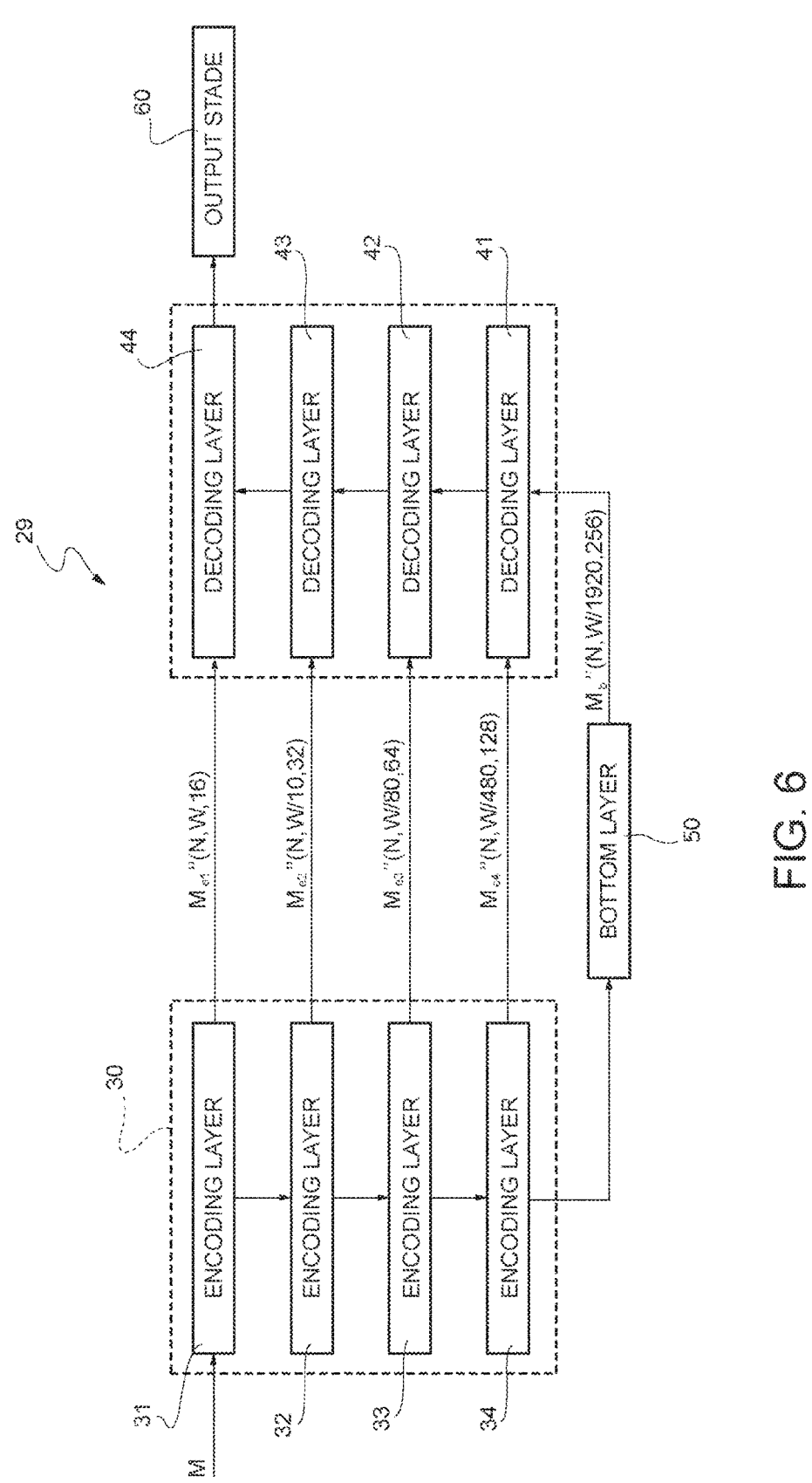
FIG. 6 shows a block diagram of a neural network.

Then, as shown again in FIG. 3, the computer 12 trains (block 106) a neural network 29, the structure of which is shown in FIG. 6. Before describing in detail the training modalities of the neural network 29, the functioning of the neural network 29 is described hereunder, on the assumption that the training is ended and with reference to the case in which, as input to the neural network 29, a generic input matrix M is provided, which includes a number of rows equal to the number N of primary quantities and a number of columns (or vectors) equal to a number W. For example, and without any loss of generality, in the following W=3840 is assumed; moreover, each column refers to a corresponding instant of time.

In detail, the neural network 29 comprises an encoding stage 30 and a decoding stage 40, a bottom layer 50 and an output stage 60.

The encoding stage 30 comprises a first, a second, a third and a fourth encoding layer 31, 32, 33 and 34, arranged in cascade, as described in greater detail below.

The decoding stage 40 comprises a first, a second, a third and a fourth decoding layer 41, 42, 43 and 44, arranged in a cascade, as described in greater detail below.

The bottom layer 50 is interposed between the fourth encoding layer 34 and the first decoding layer 41.

The output stage 60 is arranged downstream of the fourth decoding layer 44.

Figure 7:
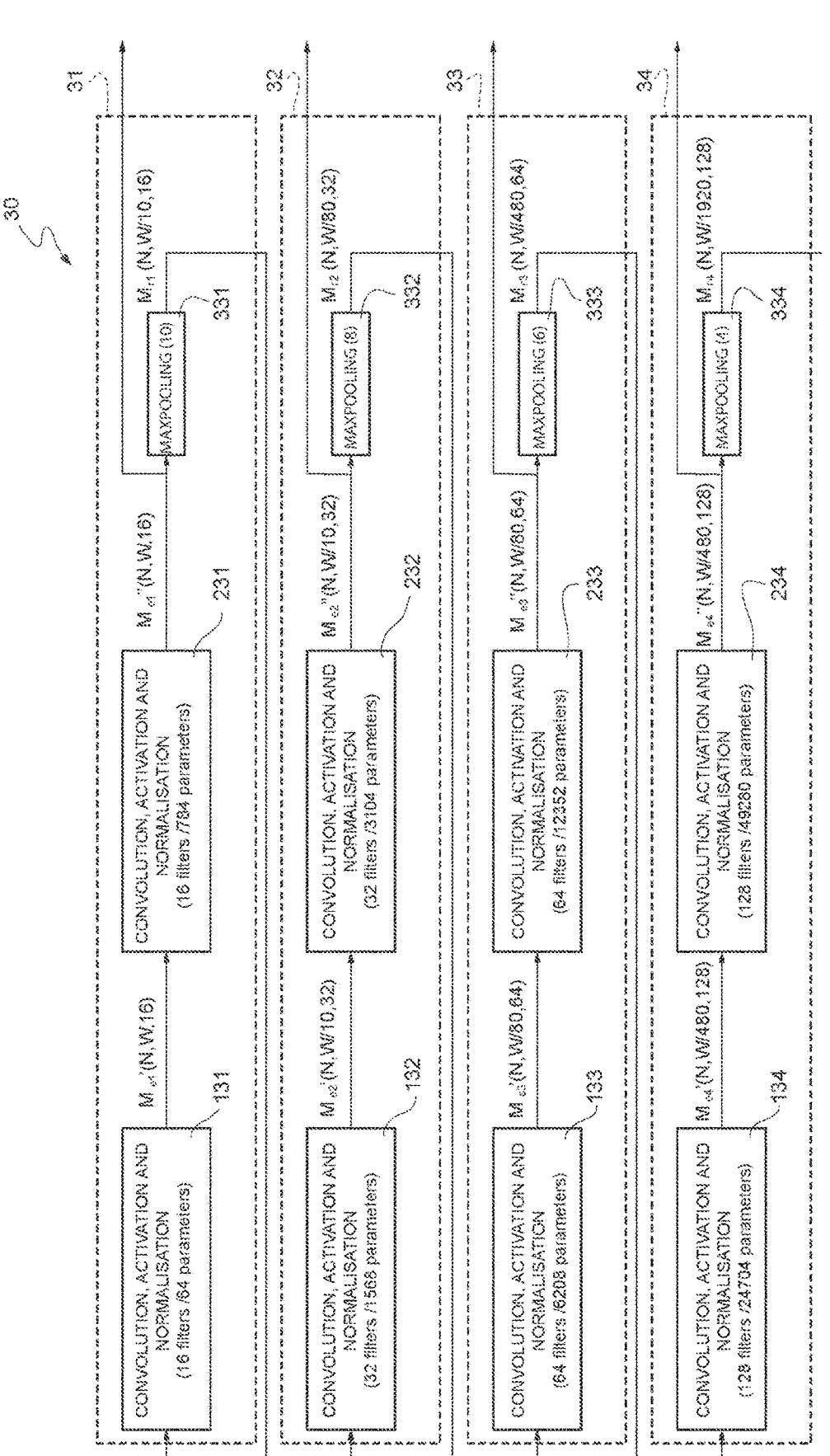
FIGS. 7, 11, 12A-12B and 15 show block diagrams of portions of the neural network shown in FIG. 6

In greater detail, as shown in FIG. 7, each of the first, second, third and fourth encoding layer 31, 32, 33 and 34 comprises a respective first processing stage (denoted with 131, 132, 133 and 134, respectively) and a respective second processing stage (denoted with 231, 232, 233 and 234, respectively), as well as a respective reduction stage (denoted with 331, 332, 333 and 334, respectively).

In detail, the first processing stage 131 of the first encoding layer 31 receives the input matrix M and generates a matrix $M_{e1}$' (N,W,16), by performing filtering, activation and normalisation operations.

In greater detail, the first processing layer 131 stores a number F1 of respective filters (for example, in the present description F1=16 is assumed) of 1×3 type; in practice, referring to an f-th filter (with f=1, 2, . . . , F1), it is defined by four parameters: a corresponding bias $w_0^f$ and a corresponding triad of coefficients $w_1^f$, $w_2^f$ and $w_3^f$. Consequently, the first processing stage 131 stores a number of respective parameters equal to 4*F1, i.e. a number of parameters equal to 64. Moreover, the first processing stage 131 performs a convolution between each of the respective filters and the input matrix M. This causes, as shown qualitatively in FIG. 8, where the rows and the columns of the input matrix M are i indexed by the indices i and j respectively, the first processing stage 131 to generate a three-dimensional matrix O(i,j,f) having dimensions N*W*F1, i.e. formed by a number equal to F1 of two-dimensional matrices $O(i,j)^f$, which have dimensions equal to N*W. Furthermore, if again the indices i and j are used to index the rows and the columns of the f-th matrix $O(i,j)^f$, it is verified:

$$O(i, j)^f = w_0^f + \sum_{s=0}^{2} M(i, j+s) * w_s^f$$

In a per se known manner, the convolution may provide for the execution of techniques for managing the elements arranged at the edges of the input matrix M, such as for example the last column of the input matrix; for example, it is possible to apply the filters to a modified matrix that is identical to the input matrix M, but including in addition a W+1-th and a W+2-th column, which are identical to the last (that is, the W-th) column of the input matrix M. It is however possible to adopt a different technique to allow applying the filters to the edges of the input matrix M.

Next, the first processing stage 131 performs a so-called activation of the matrix O(i,j,f), i.e., it applies to each element of the matrix O(i,j,f) a non-linear function, also known as an activation function (e.g., a so-called rectifier or sigmoid or hyperbolic and linear tangent) so as to obtain an activated matrix O(i,j,f), the elements of which are constituted by the results of the activation functions; subsequently, the first processing stage 131 carries out a normalisation (also known as batch-normalisation) of the activated matrix O(i,j,f), e.g. so that the elements assume values ranging between zero and one. The matrix $M_{e1}{}'$ (N,W,16) is therefore equal to the activated and normalised matrix O(i,j,f). In general, it is assumed in the following, by way of example, that all the activation functions mentioned in this description provide for the use of the same rectifier known as ELu with angular coefficient of 45°.

The second processing stage 231 of the first encoding layer 31 receives the matrix $M_{e1}{}'$ (N,W,16) generated by the first processing stage 131 and generates a matrix $M_{e1}{}''$ (N,W,16), by performing corresponding filtering, activation and normalisation operations, which are the same as the operations described with reference to the first processing stage 131, except for the following differences.

In detail, the second processing stage 231 stores a number of respective filters still equal to F1, such filters being still of 1×3 type, but being adapted to process an input of the multichannel type rather than a single channel, i.e. being adapted to process a three-dimensional matrix which is precisely the matrix $M_{e1}{}'$ (N,W,16).

In more detail, referring to an f-th filter (with f=1, 2, . . . , F1), it is defined by a corresponding bias (denoted as $w_{00}{}^f$) and by a number of triads (or kernels) of coefficients $(w_{m1}{}^f, w_{m2}{}^f, w_{m3}{}^f)$ equal to the value of the third dimension of the matrix $M_{e1}{}'$ (N,W,16), i.e. by sixteen triads of coefficients; therefore, one has m=1, . . . , 16. Each filter is therefore defined by a number of parameters equal to 49; consequently, the second processing stage 231 stores a number of respective parameters equal to 784.

In addition, the second processing stage 231 performs a convolution between each of the respective filters and the matrix $M_{e1}{}'$ (N,W,16). In particular, considering the f-th (with f=1, 2, . . . , F1) filter, the relative convolution with the matrix $M_{e1}{}'$ (N,W,16) generates a corresponding matrix O' (i,j)$^f$ having dimensions N*W and wherein:

$$O'(i, j)^f = \sum_{m=1}^{Minput} \left( w_{00}^f + \sum_{s=0}^{2} [M_{e1}'(i, j+s, m) * w_{ms}^f] \right)$$

wherein Minput represents the third dimension of the matrix $M_{e1}{}'$ (N,W,16), and so in the present case one has Minput=F1=16. Also in this case, known per se techniques may be implemented for applying the filters to the edges of the matrix $M_{e1}{}'$ (N,W,16).

As shown qualitatively in FIG. 9, the set of matrices O' (i,j)$^f$ forms a three-dimensional matrix O' (i,j,f) having dimensions N*W*F1, i.e. having a third dimension equal to the number of filters implemented by the second processing stage 231.

Subsequently, the second processing stage 231 performs an activation of the matrix O' (i,j,f), e.g. using the same activation function employed by the first processing stage 131. In this regard, for the sake of simplicity and without any loss of generality, it is assumed in the following that all the activations mentioned in this document are performed based on the same activation function. In addition, the second processing stage 231 performs a normalisation of the activated matrix O' (i,j,f), so that the elements assume values ranging between zero and one. The matrix $M_{e1}{}'$ (N,W,16) is therefore equal to the activated and normalised matrix O' (i,j,f).

The reduction stage 331 of the first encoding layer 31 receives the matrix $M_{e1}{}''$ (N,W,16), on which it performs a so-called second dimension reduction operation, e.g. with a reduction factor P1=10, so as to generate a matrix $M_{r1}$(N, W/10,16).

Figure 10:
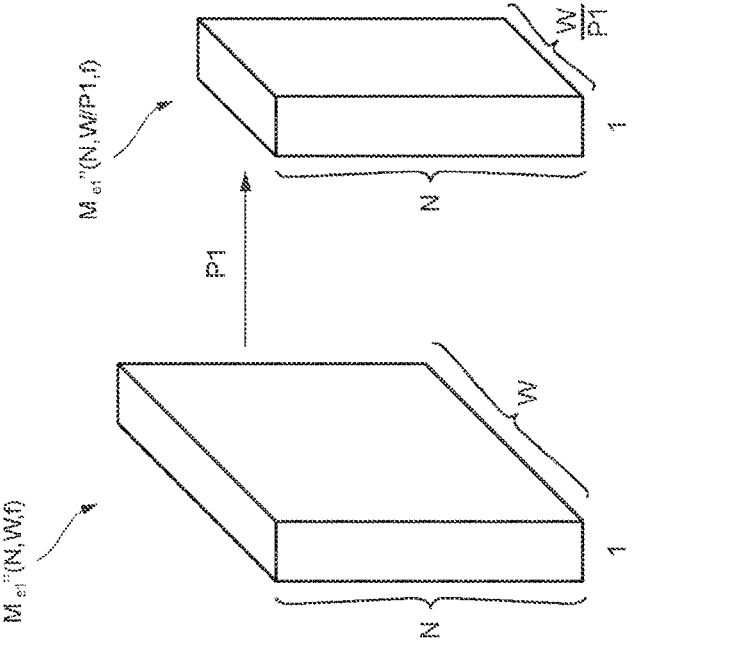

In particular, as shown schematically in FIG. 10, the reduction stage 331 performs, for each two-dimensional matrix $M_{e1}{}''$ (N,W,f) (with f=1, . . . , 16) forming the matrix $M_{e1}{}''$ (N,W,16), a so-called "max pooling" operation, which involves generating a corresponding two-dimensional matrix $M_{e1}{}''$ (N,W/P1,f). For example, for each row of the two-dimensional matrix $M_{e1}{}''$ (N,W,f), in each group formed by a number P1 of adjacent elements, the element of maximum value is selected. In practice, it is verified, with f fixed and for i=1: N and j=1:(W/P1):

$$M_{r1}(i, j, f) = \max_{k=P1*(j-1)+1:P1*j} M_{e1}''(i, k, f)$$

The second encoding layer 32 receives as input the matrix $M_{r1}$(N,W/10,16) and works in the same way as the first encoding layer 31, therefore it performs the same filtering, activation and normalisation operations, as well as the same dimension reduction operations, subject to the following differences.

In detail, the first processing stage 132 receives the matrix $M_{r1}$(N,W/10,16) and stores a number of respective filters equal to F2 (in the present example, F2=32 is assumed), each of which is of 1×3 type and is defined, as well as by a corresponding bias, by a number of triads of coefficients equal to the value of the third dimension of the matrix $M_{r1}$(N,W/10,16), i.e. by sixteen triads of respective coefficients. Each filter is therefore defined by a number of parameters equal to 49; consequently, the first processing stage 132 stores a number of respective parameters equal to 1568. For each filter, the convolution takes place in the same manner as described with reference to the second processing stage 231 of the first encoding layer 31.

Since the filters are equal to thirty-two in number, the first processing stage 132 provides, at the end of the normalisation operations, a matrix $M_{e2}{}'$ (N,W/10,32), which has precisely a third dimension equal to thirty-two.

The second processing stage 232 receives the matrix $M_{e2}{}'$ (N,W/10,32) and performs respective filtering, activation and normalisation operations, based on a number of respective filters still equal to F2=32; each filter is of 1×3 type and is defined, as well as by a corresponding bias, by a number of triads of coefficients equal to the value of the third dimension of the matrix $M_{e2}'$ (N,W/10,32), i.e. by thirty-two triads of respective coefficients. Each filter is therefore defined by a number of parameters equal to 97; consequently, the second processing stage 232 stores a number of respective parameters equal to 3104. The second processing stage 232 generates a matrix $M_{e2}''$ (N,W/10,32), which has a third dimension precisely equal to thirty-two. The reduction stage 332 of the second encoding layer 32 receives the matrix $M_{e2}''$ (N,W/10,32), on which it performs a reduction operation of the second dimension, with a reduction factor P2=8, so as to generate a matrix $M_{r2}$ (N,W/80,32). The reduction takes place in the same way as described with reference to the reduction stage 331 of the first encoding layer 31.

The third encoding layer 33 receives as input the matrix $M_{r2}$ (N,W/80,32) and works in the same way as the first and second encoding layer 31, 32, therefore it performs the same filtering, activation and normalisation operations, as well as the same dimension reduction operations, subject to the following differences.

In detail, the first processing stage 133 receives the matrix $M_{r2}$ (N,W/80,32) and stores a number of respective filters equal to F3 (in the present example, F3=64 is assumed), each of which is of 1×3 type and is defined, as well as by a corresponding bias, and by a number of triads of coefficients equal to the value of the third dimension of the matrix $M_{r2}$ (N,W/80,32), i.e. by thirty-two triads of respective coefficients. Each filter is therefore defined by a number of parameters equal to 97; consequently, the first processing stage 133 stores a number of respective parameters equal to 6208. Moreover, since the filters are equal to sixty-four in number, the first processing stage 133 provides, at the end of the normalisation operations, a matrix $M_{e3}'$ (N,W/80,64), which has precisely a third dimension equal to sixty-four.

The second processing stage 233 receives the matrix $M_{e3}'$ (N,W/80,64) and performs respective filtering, activation and normalisation operation, based on a number of respective filters still equal to F3=64; each filter is of 1×3 type and is defined, as well as by a corresponding bias, by a number of triads of coefficients equal to the value of the third dimension of the matrix $M_{e3}'$ (N,W/80,64), i.e. by sixty-four triads of respective coefficients. Each filter is therefore defined by a number of parameters equal to 193; consequently, the second processing stage 233 stores a number of respective parameters equal to 12352. The second processing stage 233 generates a matrix $M_{e3}''$ (N,W/80,64), which has a third dimension precisely equal to sixty-four. The reduction stage 333 of the third encoding layer 33 receives the matrix $M_{e3}''$ (N,W/80,64), on which it performs a reduction operation of the second dimension, with a reduction factor P3=6, so as to generate a matrix $M_{r3}$ (N,W/480, 64).

The fourth encoding layer 34 receives as input the matrix $M_{r3}$ (N,W/480,64) and works in the same way as the first, second and third encoding layer 31, 32, 33, therefore it performs the same filtering, activation and normalisation operations, as well as the same dimension reduction operations, subject to the following differences.

In detail, the first processing stage 134 receives the matrix $M_{r3}$ (N,W/480,64) and stores a number of respective filters equal to F4 (in the present example, F4=128 is assumed), each of which is of 1×3 type and is defined, as well as by a corresponding bias, by a number of triads of coefficients equal to the value of the third dimension of the matrix $M_{r3}$ (N,W/480,64), i.e. by sixty-four triads of respective coefficients. Each filter is therefore defined by a number of parameters equal to 193; consequently, the first processing stage 134 stores a number of respective parameters equal to 24704. Moreover, since the filters are equal to one hundred and twenty-eight in number, the first processing stage 134 provides, at the end of the normalisation operations, a matrix $M_{e4}'$ (N,W/480,128), which has a third dimension equal to one hundred and twenty-eight.

The second processing stage 234 receives the matrix $M_{e4}'$ (N,W/480,128) and performs respective filtering, activation and normalisation operations, based on a number of respective filters still equal to F4=128; each filter is of 1×3 type and is defined, as well as by a corresponding bias, by a number of triads of coefficients equal to the value of the third dimension of the matrix $M_{e4}'$ (N,W/480,128), i.e. by one hundred and twenty-eight triads of respective coefficients. Each filter is therefore defined by a number of parameters equal to 385; consequently, the second processing stage 234 stores a number of respective parameters equal to 49280. The second processing stage 234 generates a matrix $M_{e4}''$ (N,W/480, 128), which has a third dimension precisely equal to one hundred and twenty-eight.

The reduction stage 334 of the fourth encoding layer 34 receives the matrix $M_{e4}''$ (N,W/480,128), on which it performs a reduction operation of the second dimension, with a reduction factor P4=4, so as to generate a matrix $M_{r4}$ (N,W/1920,128).

Figure 11:
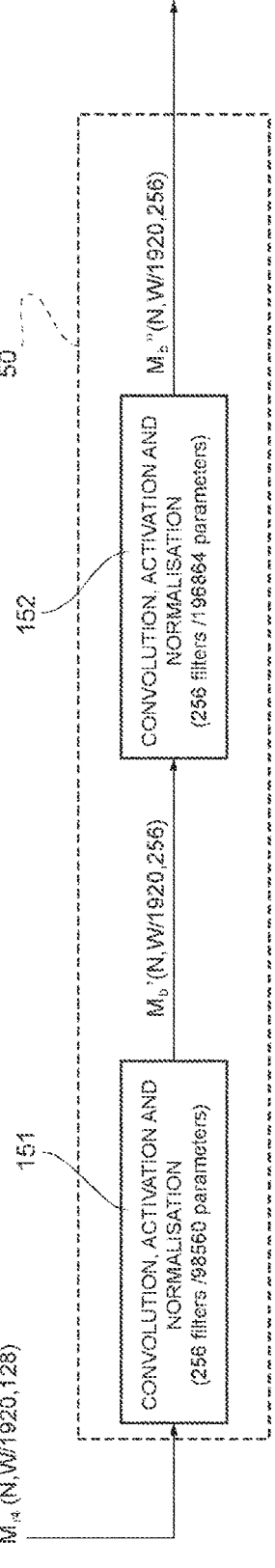

As shown in FIG. 11, the bottom layer 50 receives the matrix $M_{r4}$ (N,W/1920,128). Furthermore, the bottom layer 50 comprises a respective first processing stage 151 and a respective second processing stage 152, which operate in the same manner as described with reference to the first and second processing stages of the encoding step 30, subject to the following differences.

In detail, the first processing stage 151 receives the matrix $M_{r4}$ (N,W/1920,128) and stores a number of respective filters equal to F5 (in the present example, F5=256 is assumed), each of which is of 1×3 type and is defined, as well as by a corresponding bias, by a number of triads of coefficients equal to the value of the third dimension of the matrix $M_{r4}$ (N,W/1920,128), i.e. by one hundred and twenty-eight triads of respective coefficients. Each filter is therefore defined by a number of parameters equal to 385; consequently, the first processing stage 151 stores a number of respective parameters equal to 98560. Furthermore, the first processing stage 151 provides, at the end of the normalisation operations, a matrix $M_b'$ (N,W/1920,256).

The second processing stage 152 receives the matrix $M_b'$ (N,W/1920,256) and performs the respective filtering, activation and normalisation operations, based on a number of respective filters still equal to F5; each filter is of 1×3 type and is defined, as well as by a corresponding bias, by a number of triads of coefficients equal to 256. Each filter is therefore defined by 769 parameters; consequently, the second processing stage 152 stores a number of respective parameters equal to 196864. The second processing stage 152 generates a matrix $M_b''$ (N,W/1920,256), which is provided to the decoding stage 40.

Figure 12A:
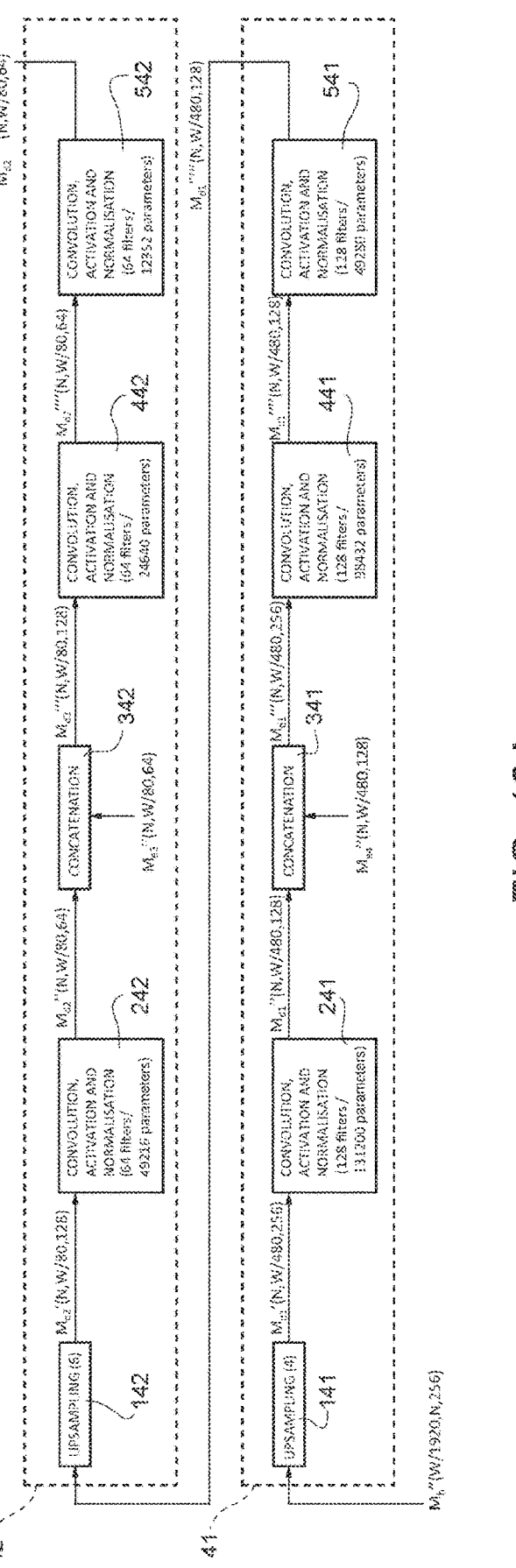
Figure 12B:
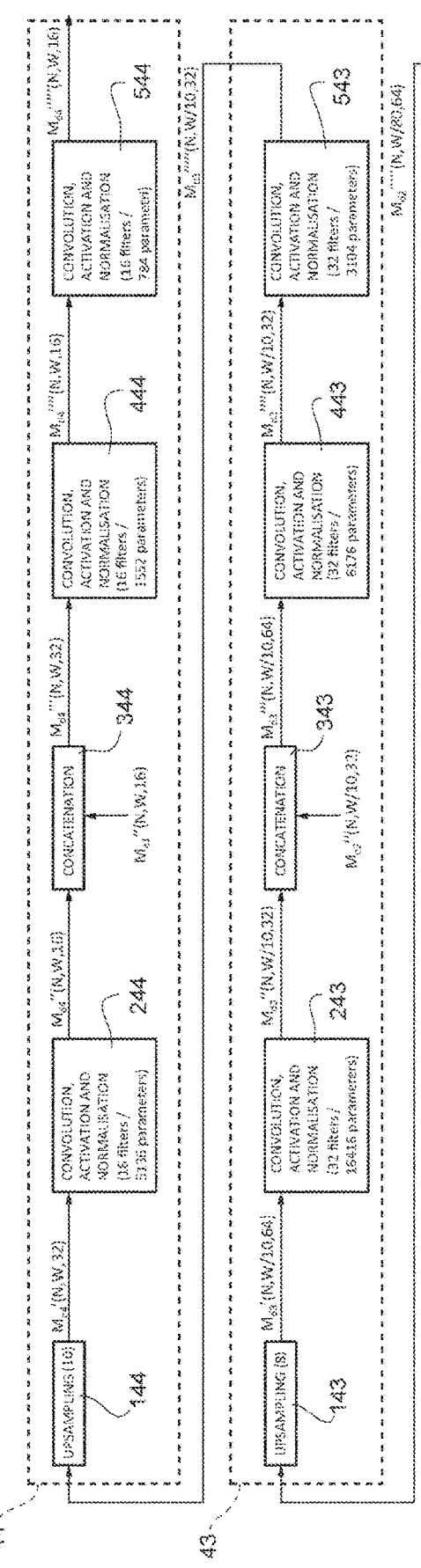

As shown in FIGS. 12A and 12B, each of the first, second, third and fourth decoding layer 41, 42, 43 and 44 comprises a respective upsampling stage (denoted with 141, 142, 143 and 144, respectively), a respective first processing stage (denoted with 241, 242, 243 and 244 respectively), a respective concatenation stage (denoted with 341, 342, 343 and 344 respectively), a respective second processing stage (denoted with 441, 442, 443 and 444 respectively) and a respective third processing stage (denoted with 541, 542, 543 and 544 respectively).

Figure 13:
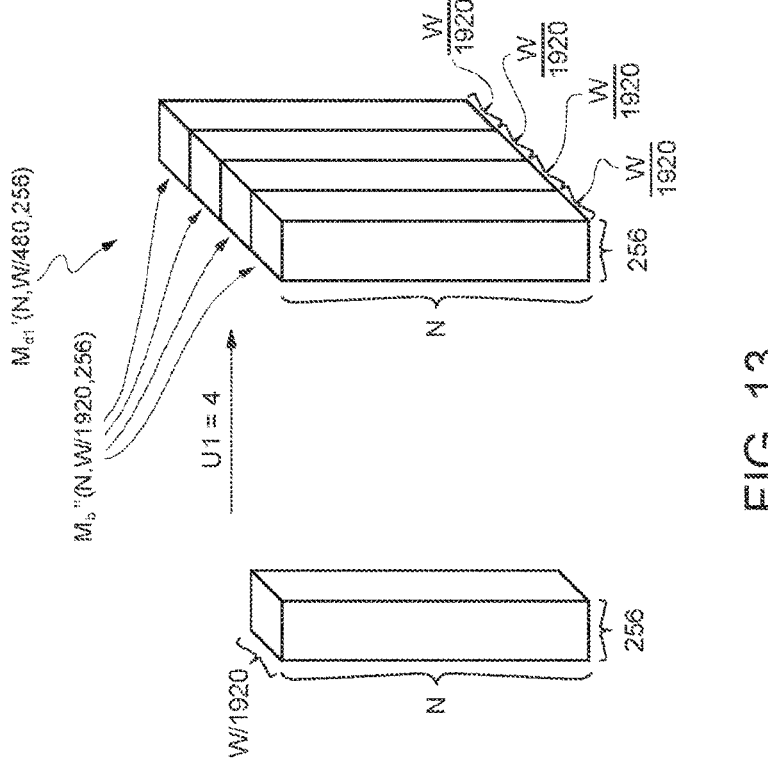
FIGS. 10, 13, 14 and 16 schematically show data structures subject to operations according to the present method.

In detail, the upsampling stage 141 of the first decoding layer 41 performs an upsampling operation of the matrix $M_b$" (N,W/1920,256), with upsampling factor U1=P4=4, so as to generate a matrix $M_{d1}$' (N,W/480,256). In particular, the matrix $M_{d1}$' (N,W/480,256) is obtained by stacking along the second dimension a number U1 of three-dimensional matrices equal to the matrix Mb" (N,W/1920,256), as shown qualitatively in FIG. 13.

The first processing stage 241 of the first decoding layer 41 receives the matrix $M_{d1}$' (N,W/480,256) and generates a matrix $M_{d1}$" (N,W/480,128), by performing filtering, activation and normalisation operations.

In detail, the first processing stage 241 receives the matrix $M_{d1}$' (N,W/480,256) and stores a number of respective filters equal to F4, i.e. 128. Each filter is of 1×4 type and is defined, as well as by a corresponding bias, by a number of quaternals of coefficients equal to the value of the third dimension of the matrix $M_{d1}$' (N,W/480,256), i.e. by two hundred and fifty-six quaternals of respective coefficients. Each filter is therefore defined by a number of parameters equal to 1025; consequently, the first processing stage 241 stores a number of respective parameters equal to 131200. For each filter, the convolution takes place in the same way as described with reference to the convolutions performed by the encoding stage 30. Since the filters are equal to 128 in number, the first processing provides, at the end of the normalisation stage 241 operations, the matrix $M_{d1}$" (N,W/480,128), which has precisely a third dimension equal to 128.

Figures 14, 16:
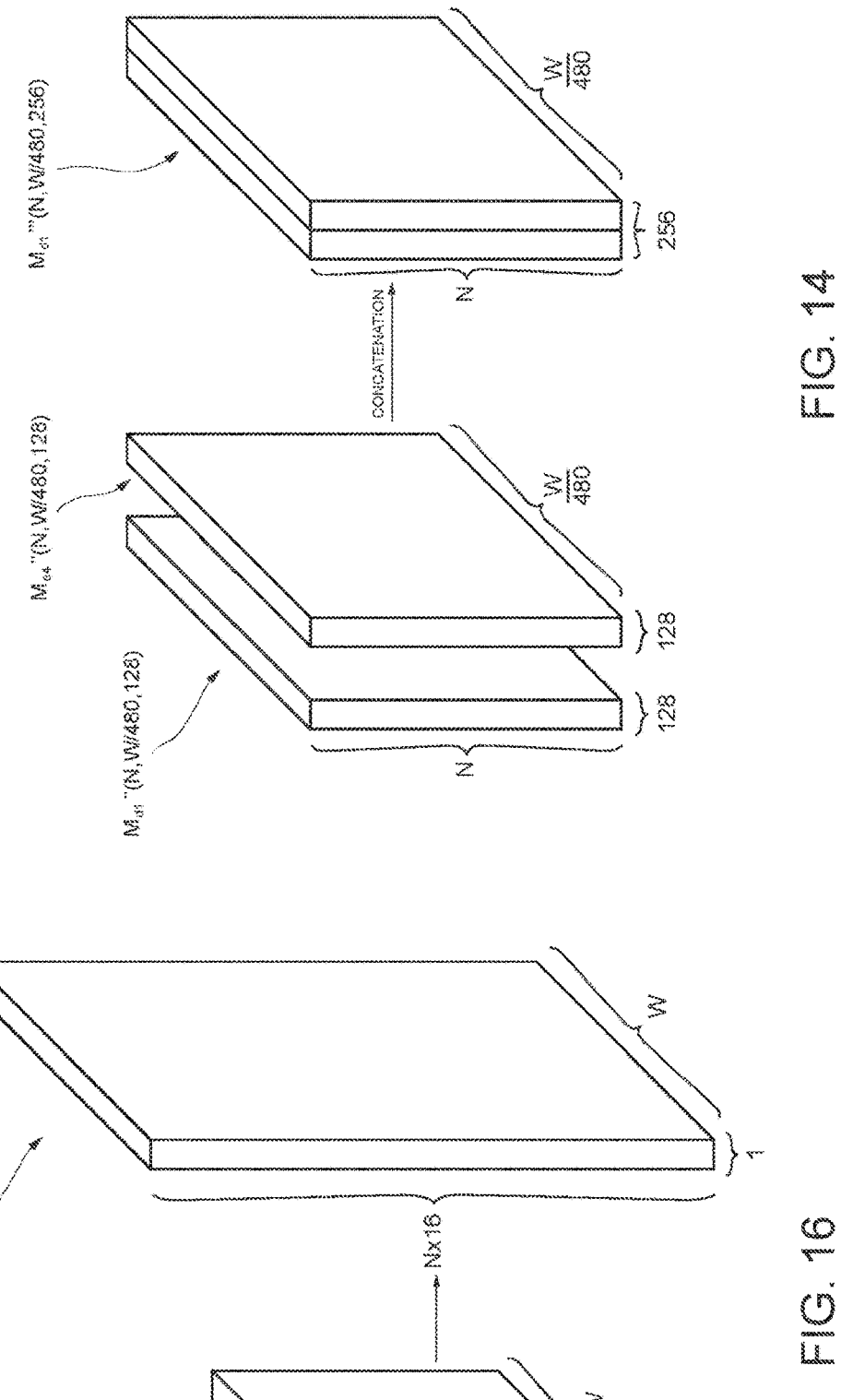

The concatenation stage 341 of the first decoding layer 41 concatenates the matrix $M_{d1}$" (N,W/480,128) with the matrix $M_{e4}$" (N,W/480,128) generated by the fourth encoding layer 34, so as to obtain a matrix $M_{d1}$'" (N,W/480,256). In particular, as shown in FIG. 14, the concatenation is performed by stacking the matrix $M_{d1}$" (N,W/480,128) and the matrix $M_{e4}$" (N,W/480,128) along the third dimension.

The second processing stage 441 receives the matrix $M_{d1}$'" (N,W/480,256) and performs respective filtering, activation and normalisation operations, based on a number of respective filters still equal to F4=128. Each filter is of 1×3 type and is defined, as well as by a corresponding bias, by a number of triads of coefficients equal to the third of value of the dimension the matrix $M_{d1}$'" (N,W/480,256), i.e. equal to 256. Each filter is therefore defined by a number of parameters equal to 769; consequently, the second processing stage 441 stores a number of respective parameters equal to 98432. The second processing stage 441 generates a matrix $M_{d1}$"" (N,W/480,128), which has a third dimension precisely equal to thirty-two. The third processing stage 541 receives the matrix $M_{d1}$"" (N,W/480,128) and performs respective filtering, activation and normalisation operations, based on a number of respective filters still equal to F4=128. Each filter is of 1×3 type and is defined, as well as by a corresponding bias, by a number of triads of coefficients equal to the value of the third dimension of the matrix $M_{d1}$"" (N,W/480,128), i.e. equal to 128. Each filter is therefore defined by a number of parameters equal to 385; consequently, the third processing stage 541 stores a number of respective parameters equal to 49280. The third processing stage 541 generates a matrix $M_{d1}$""' (N,W/480,128), which has a third dimension precisely equal to 128.

The second decoding layer 42 receives the matrix $M_{d1}$""' (N,W/480,128) and works in the same way as the first decoding layer 41, thus performing upsampling, filtering, activation and normalisation operations, as well as concatenation operations.

In detail, the upsampling stage 142 of the second decoding layer 42 performs an upsampling operation of the matrix $M_{d1}$""' (N,W/480,128), with upsampling factor U2=P3=6, so as to generate a matrix $M_{d2}$' (N,W/80, 128). Upsampling takes place in the same way as described with reference to upsampling performed by the first decoding layer 41.

The first processing stage 242 of the second decoding layer 42 receives the matrix $M_{d2}$' (N,W/80, 128) and generates a matrix $M_{d2}$"(N,W/80,64), by performing filtering, activation and normalisation operations.

In detail, the first processing stage 242 stores a number of respective filters equal to F3, i.e. 64. Each filter is of 1×6 type and is defined, as well as by a corresponding bias, by a number of sets of six coefficients equal to the value of the third dimension of the matrix $M_{d2}$' (N,W/80, 128), i.e. by one hundred and twenty-eight sets of six coefficients. Each filter is therefore defined by a number of parameters equal to 769; consequently, the first processing stage 242 stores a number of respective parameters equal to 49216. For each filter, the convolution takes place in the same way as described with reference to the convolutions performed by the encoding stage 30. Since the filters are equal to 64 in number, the first processing stage 242 provides, at the end of the normalisation operations, the matrix $M_{d2}$" (N,W/80,64), which has precisely the third dimension equal to 64.

The concatenation stage 342 of the second decoding layer 42 concatenates the matrix $M_{d2}$" (N,W/80,64) with the matrix $M_{e3}$"(N,W/80,64) generated by the third encoding layer 33, so as to obtain a matrix $M_{d2}$'" (N,W/80, 128). The concatenation is performed in the same manner as described with reference to the concatenation stage 341 of the first decoding layer 41.

The second processing stage 442 receives the matrix $M_{d2}$'" (N,W/80, 128) and performs respective filtering, activation and normalisation operations, based on a number of respective filters still equal to F3=64. Each filter is of 1×3 type and is defined, as well as by a corresponding bias, by a number of triads of coefficients equal to the value of the third dimension of the matrix $M_{d2}$'" (N,W/80, 128), i.e. equal to 128. Each filter is therefore defined by a number of parameters equal to 385; consequently, the second processing stage 442 stores a number of respective parameters equal 24640. The second processing stage 442 generates a matrix $M_{d2}$"" (N,W/80,64), which has a third dimension precisely equal to 64.

The third processing stage 542 receives the matrix $M_{d2}$'" (N,W/80,64) and performs respective filtering, activation and normalisation operations, based on a number of respective filters still equal to F3=64. Each filter is of 1×3 type and is defined, as well as by a corresponding bias, by a number of triads of coefficients equal to the value of the third dimension of the matrix $M_{d2}$"" (N,W/80,64), i.e. equal to 64. Each filter is therefore defined by a number of parameters equal to 193; consequently, the third processing stage 542 stores a number of respective parameters equal to 12352. The third processing stage 542 generates a matrix $M_{d2}$""' (N,W/80,64), which has a third dimension precisely equal to 64.

The third decoding layer 43 receives the matrix $M_{d2}$""' (N,W/80,64) and works in the same way as the first and second decoding layer 41, 42.

In detail, the upsampling stage 143 of the third decoding layer 43 performs an upsampling operation of the matrix $M_{d2}$""' (N,W/80,64), with upsampling factor U3=P2=8, so as to generate a matrix $M_{d3}'$ (N,W/10, 64). Upsampling takes place in the same way as described with reference to upsampling performed by the first decoding layer 41.

The first processing stage 243 of the third decoding layer 43 receives the matrix $M_{d3}'$ (N,W/10, 64) and generates a matrix $M_{d3}''$ (N,W/10, 32), by performing filtering, activation and normalisation operations.

In detail, the first processing stage 243 stores a number of respective filters equal to F2, i.e. 32. Each filter is of 1×8 type and is defined, as well as by a corresponding bias, by a number of sets of eight coefficients equal to the value of the third dimension of the matrix $M_{d3}'$ (N,W/10, 64), i.e. by sixty-four sets of 41 eight coefficients. Each filter is therefore defined by a number of parameters equal to 513; consequently, the first processing stage 243 stores a number of respective parameters equal to 16416. For each filter, the convolution takes place in the same way as described with reference to the convolutions performed by the encoding stage 30. Since the filters are equal to 32 in number, the first processing stage 243 provides, at the end of the normalisation operations, the matrix $M_{d3}''$ (N,W/10,32), which has precisely the third dimension equal to 32.

The concatenation stage 343 of the third decoding layer 43 concatenates the matrix $M_{d3}''$ (N,W/10,32) with the matrix $M_{e2}''$ (N,W/10,32) generated by the second encoding layer 32, so as to obtain a matrix $M_{d3}'''$ (N,W/10, 64). The concatenation is performed in the same manner as described with reference to the concatenation stage 341 of the first decoding layer 41.

The second processing stage 443 receives the matrix $M_{d3}'''$ (N,W/10, 64) and performs respective filtering, activation and normalisation operations, based on a number of respective filters still equal to F2=32. Each filter is of 1×3 type and is defined, as well as by a corresponding bias, by a number of triads of coefficients equal to the value of the third dimension of the matrix $M_{d3}'''$ (N,W/10, 64), i.e. equal to 64. Each filter is therefore defined by a number of parameters equal to 193; consequently, the second processing stage 443 stores a number of respective parameters equal to 6176. The second processing stage 443 generates a matrix $M_{d3}''''$ (N,W/10,32), which has a third dimension precisely equal to 32.

The third processing stage 543 receives the matrix $M_{d3}''''$ (N,W/10,32) and performs respective filtering, activation and normalisation operations, based on a number of respective filters still equal to F2=32. Each filter is of 1×3 type and is defined, as well as by a corresponding bias, by a number of triads of coefficients equal to the value of the dimension of the matrix third $M_{d3}''''$ (N,W/10,32), i.e. equal to 32. Each filter is therefore defined by a number of parameters equal to 97; consequently, the third processing stage 543 stores a number of respective parameters equal to 3104. The third processing stage 543 generates a matrix $M_{d3}'''''$ (N,W/10, 32), which has a third dimension precisely equal to 32.

The fourth decoding layer 44 receives the matrix $M_{d3}'''''$ (N,W/10,32) and works in the same way as the first, second and third decoding layer 41, 42, 43.

In detail, the upsampling stage 144 of the fourth decoding layer 44 performs an upsampling operation of the matrix $M_{d3}'''''$ (N,W/10,32), with upsampling factor U4=P1=10, so as to generate a matrix $M_{d4}'$ (N,W,32). Upsampling takes place in the same way as described with reference to upsampling performed by the first decoding layer 41.

The first processing stage 244 of the fourth decoding layer 44 receives the matrix $M_{d4}'$ (N,W,32) and generates a matrix $M_{d4}''$ (N,W,16), by performing filtering, activation and normalisation operations.

In detail, the first processing stage 244 stores a number of respective filters equal to F1, i.e. 16. Each filter is of 1×10 type and is defined, as well as by a corresponding bias, by a number of sets of ten coefficients equal to the value of the third dimension of the matrix $M_{d4}'$ (N,W,32), i.e. by thirty-two sets of ten coefficients. Each filter is therefore defined by a number of parameters equal to 321; consequently, the first processing stage 244 stores a number of respective parameters equal to 5136. For each filter, the convolution takes place in the same way as described with reference to the convolutions performed by the encoding stage 30. Since the filters are equal to 16 in number, the first processing stage 244 provides, at the end of the normalisation operations, the matrix $M_{d4}''$ (N,W,16), which has precisely the third dimension equal to 16.

The concatenation stage 344 of the fourth decoding layer 44 concatenates the matrix $M_{d4}''$ (N,W,16) with the matrix $M_{e1}''$ (N,W,16) generated by the first encoding layer 31, so as to obtain a matrix $M_{d4}'''$ (N,W,32). The concatenation is performed in the same manner as described with reference to the concatenation stage 341 of the first decoding layer 41. The second processing stage 444 receives the matrix $M_{d4}'''$ (N,W,32) and performs respective filtering, activation and normalisation operations, based on a number of respective filters still equal to F1=16. Each filter is of 1×3 type and is defined, as well as by a corresponding bias, by a number of triads of coefficients equal to the value of the third dimension of the matrix $M_{d4}'''$ (N,W,32), i.e. equal to 32. Each filter is therefore defined by a number of parameters equal to 97; consequently, the second processing stage 444 stores a number of respective parameters equal to 1552. The second processing stage 444 generates a matrix $M_{d4}''''$ (N,W,16), which has a third dimension precisely equal to 16.

The third processing stage 544 receives the matrix $M_{d4}''''$ (N,W,16) and performs respective filtering, activation and normalisation operations, based on a number of respective filters still equal to F1=16. Each filter is of 1×3 type and is defined, as well as by a corresponding bias, by a number of triads of coefficients equal to the value of the third dimension of the matrix $M_{d4}''''$ (N,W,16), i.e. equal to 16. Each filter is therefore defined by a number of parameters equal to 49; consequently, the third processing stage 544 stores a number of respective parameters equal to 784. The third processing stage 544 generates a matrix $M_{d4}'''''$ (N,W,16), which has a third dimension precisely equal to 16 and is provided to output stage 60.

Figure 15:
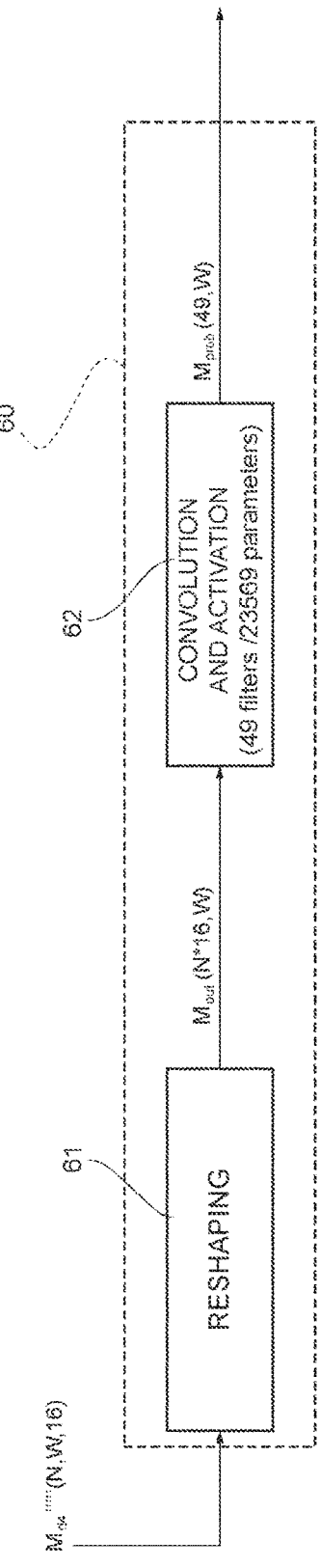

As shown in FIG. 15, the output stage 60 comprises a reshaping stage 61 and a respective filtering and activation stage 62.

The reshaping stage 61 receives the matrix $M_{d4}'''''$ (N,W, 16) and changes its dimensions in the manner shown in FIG. 16.

In particular, the reshaping stage 61 generates a two-dimensional matrix $M_{out}$ (N*16,W), which is obtained by stacking along the first dimension the sixteen two-dimensional matrices $M_{d4}'''''$ (N,W,f) (with f=1, . . . , 16) that form the matrix $M_{d4}'''''$ (N,W,16).

The filtering and activation stage 62 receives the matrix $M_{out}$ (N*16,W) and performs respective filtering operations and subsequent activation, based on a number of respective filters equal to the above-mentioned number NUM_C, i.e. equal to the number of classes, so to generate a matrix $M_{prob}$ (49,W). In the example shown in FIG. 15, NUM_C=49 was assumed.

Each filter of the filtering and activation stage 62 is of type (N*16)×1, i.e., it is therefore defined, as well as by a corresponding bias $wp_0^k$, by a set of coefficients

US 12,688,420 B2

15

$\mathrm{wp_1}^k, \ldots \mathrm{Wp}_{N*16}{}^k$, with k=1, ..., NUM_C; in other words, each filter is defined by a number of parameters equal to N*16+1. Furthermore, the filtering and activation stage 62 performs a convolution between each of the respective filters and the matrix $\mathrm{M}_{out}$ (N*16,W), so as to calculate the elements of the corresponding row of the matrix $\mathrm{M}_{prob}$ (49,W).

Figure 17:
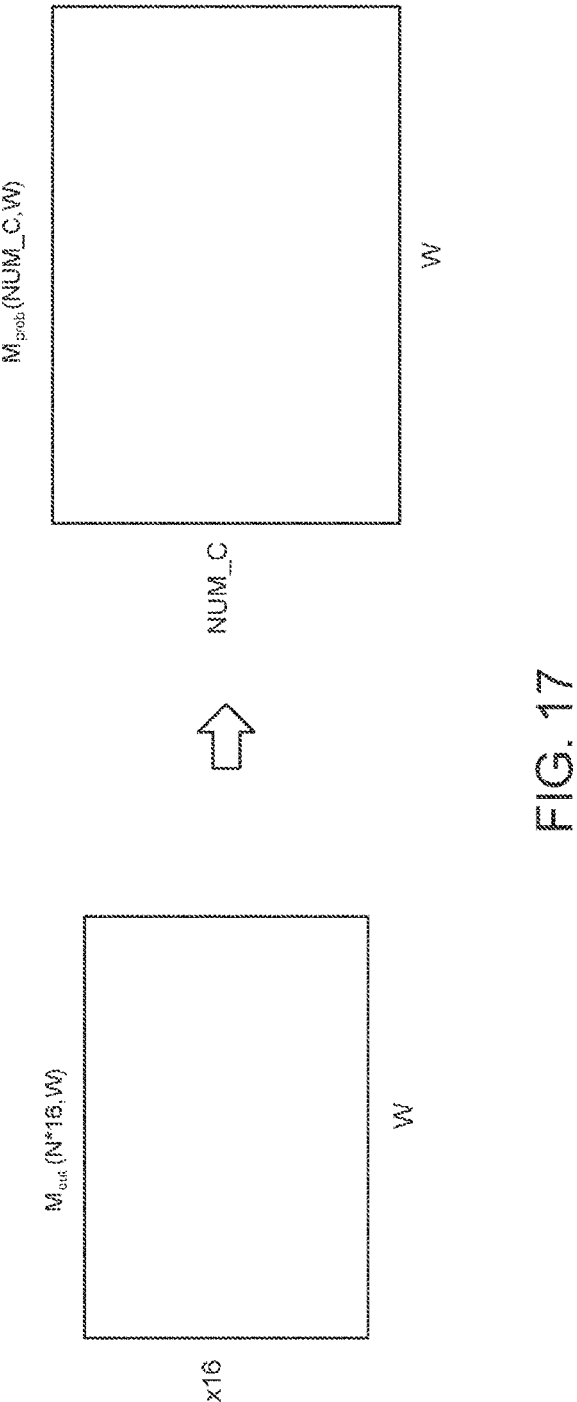

In particular, as shown qualitatively in FIG. 17, considering the k-th (with k=1, 2, ..., NUM_C) filter, it is applied to each column of the matrix $\mathrm{M}_{out}$ (N*16,W), so as to generate the values of the k-th row of the matrix $\mathrm{M}_{prob}$ (N*16,W), which are equal to:

$$M_{prob}(k, j) = wp_0^k + \sum_{s=0}^{N*16-1} \left(M_{out}(s, j) * wp_s^k\right)$$

with j=1, ..., W.

Consequently, the matrix $\mathrm{M}_{prob}$ (49,W) includes a column for each of the instants of time to which the input matrix M referred; each column is formed by a vector that includes a number of elements equal to NUM_C, each element being equal to an estimate of the probability that, in the instant of time to which the column refers, a manoeuvre belonging to the class corresponding to the element was performed.

In other words, each column of the matrix $\mathrm{M}_{prob}$ (49,W) refers to a corresponding instant of time and is formed by a vector that includes, for each class, the corresponding estimate of the probability that, at that instant of time, a manoeuvre belonging to that class was performed. In other words, the matrix $\mathrm{M}_{prob}$ (49,W) was generated starting from the input matrix M and provides a segmentation relative to the classes of the manoeuvres, to which they belong, performed during the instants of time referred to by the input matrix M. Moreover, considering a generic w-th column of the matrix $\mathrm{M}_{prob}$ (49,W), the elements of this column are a (non-linear) function of the values of the parameters of the neural network 29 and of the values of the elements of the input matrix M.

Again with reference to FIG. 3, the training (block 106) of the neural network 29 is performed as shown in FIG. 18.

In detail, initially, the computer 12 initialises (block 108) the previously described parameters of the neural network 29, in a per se known way, so that they assume a first set of values. For example, each value of such a first set of values may be extracted randomly from a standard normal distribution.

Subsequently, the computer 12 selects (block 109) portions of the e training data structure 10, which are referred to in the following as the training matrices.

In detail, the training matrices (two shown in FIG. 4, denoted with TM1 and TM2, respectively, by way of example only) have dimensions equal to N*W (with N equal to the number of rows and W equal to the number of columns), i.e., they have the same dimensions as the aforementioned input matrix M. Moreover, without any loss of generality, the training matrices are formed by adjacent and non-overlapping portions of the training data structure 10, i.e., they do not have any training vector in common. In this regard, FIG. 4 shows segments having a length equal to a number of samples equal to W, which indicate the arrangements of corresponding training matrices. Furthermore, although not apparent from FIG. 4, W may be much greater than the number of samples that are typically acquired by the monitoring system 2 during the execution of a generic test manoeuvre, so that each training matrix includes numerous data groups of the training data structure 10, i.e. it includes samples of the primary quantities relative to a plurality of test manoeuvres.

Subsequently, assuming that a number NUM_W of training matrices has been selected, the computer 12 generates (block 110) a number (hereafter referred to as NUM_L) of batches of training matrices. For this purpose, the computer 12 may for example select the first NUM_ML (with NUM_ML representing an integer) training matrices, so that they form the first batch, and subsequently it may select the second NUM_ML training matrices, so that they form the second batch, and so on, until the training matrices are exhausted; thus, all batches include a number of training matrices equal to NUM_ML (with NUM_ML<NUM_W), except the last batch, which may include a smaller number of training matrices. Thus, the number NUM_L batches of generated is equal to ceil (NUM_W/NUM_ML). In other words, the computer 12 groups the training matrices into batches.

Then, for each batch, the operations described below are performed; these operations are then iterated for a number of times equal to the number NUM_L of batches.

In detail, the neural network 29 is applied to each training matrix of the batch (block 111), the parameters of which are equal to a set of current values; at the first iteration this set of current values is equal to the aforementioned first set of values. In this way, a corresponding matrix $\mathrm{M}_{prob}$ (NUM_C, W) is obtained for each training matrix.

Figure 19:
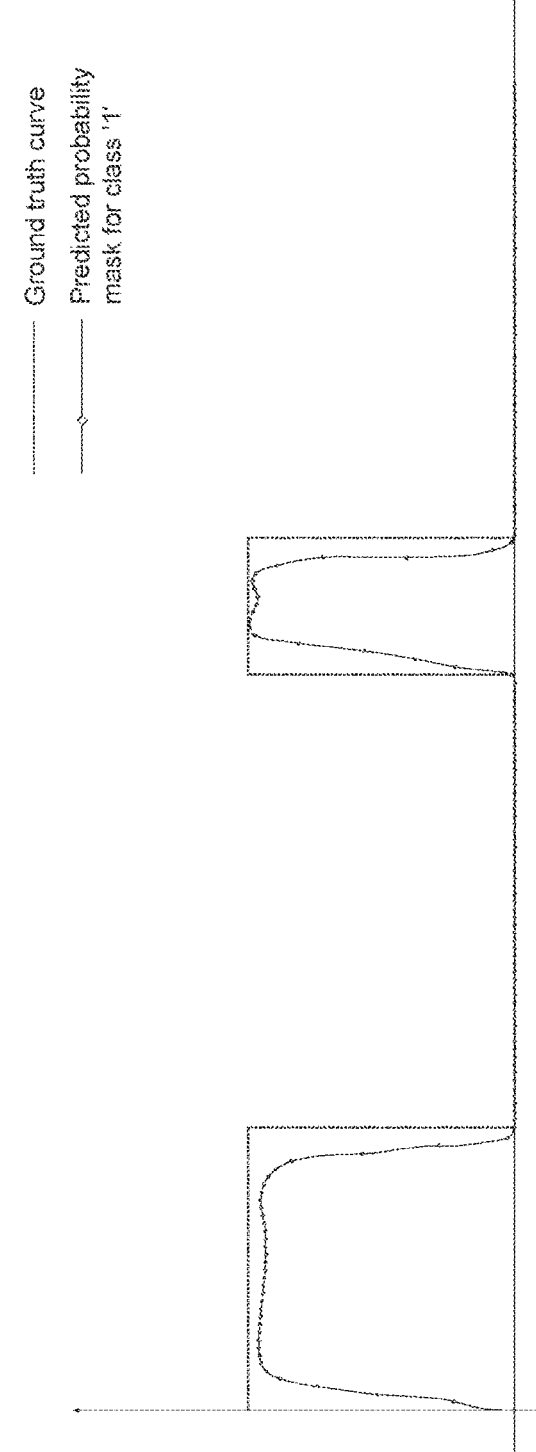
FIG. 19 schematically shows the trends of curves according to this method.

In practice, as shown in FIG. 19, where for simplicity's sake it has been assumed that only a class '0' and a class '1' are present, for each training matrix a corresponding predicted probability mask is obtained for each class, i.e. a discrete curve whose points are formed by the elements (equal to W in number) of the relative row of the corresponding matrix $\mathrm{M}_{prob}$ (NUM_C,W). In particular, FIG. 19 shows the predicted probability mask relative to class '1'.

In addition, for each training matrix, the computer 12 stores a so-called "ground truth" curve, i.e. a curve which is formed by a number of samples equal to W and which indicates, sample by sample, to which class the test manoeuvre performed at the corresponding instant of time belongs. An example of a "ground truth" curve, relative to the simplified scenario with only the classes '0' and '1', is shown again in FIG. 19.

In greater detail, the "ground truth" curve can assume a number of levels equal to the number NUM_C of classes, each level being associated precisely with a corresponding class.

On the basis of the matrices $\mathrm{M}_{prob}$ (NUM_C,W) relating to the training matrices of the batch and of the corresponding ground truth curves, the computer 12 updates (block 113) the value of the parameters of the neural network 29, which thus assume a set of updated values. In particular, the computer 12 determines the set of updated values so as to approach the minimum of a loss function, which is indicative of the difference between each predicted probability mask and the corresponding "ground truth" curve.

For example, in the following it is assumed that the loss function is of the so-called "sparse categorical cross-entropy" type, i.e. it is assumes that, considering a generic w-th column $\mathrm{M}_{prob}$ (NUM_C,w) (with w fixed and ranging between 1 and W) of a matrix $\mathrm{M}_{prob}$ (NUM_C,W) relative to any training matrix, the corresponding contribution to the loss function is equal to:

$$\sum_{nc=1}^{NUM\_C} tr(w) * \log\left(M_{prob}(nc, w)\right)$$

wherein tr(w) represents the w-th value of the "ground truth" curve, i.e. the value of the "ground truth" curve that corresponds to the aforementioned w-th column $M_{prob}$ (NUM_C, w). In addition, the loss function requires that the contributions relative to the columns of the matrix $M_{prob}$ (NUM_C, W) are averaged between them in order to obtain a corresponding average value. Furthermore, it is assumed that the loss function, when calculated based on the matrices $M_{prob}$ (NUM_C,W) relative to the training matrices (equal to NUM_ML in number) of the batch, provides for averaging the corresponding average values.

In more detail, in order to update the values of the parameters of the neural network 29, and thus to determine the aforementioned set of updated values, the computer 12 may apply methods which are per se such as, for example, the so-called gradient technique, which envisages identifying the set of updated values so that the loss function calculated based on the set of updated values assumes a smaller value than the value assumed by the loss function when calculated based on the set of current values. In particular, the set of updated values derives in a per se known way from the set of current values, based on the following updating equation:

$$E_{k+1} = E_k - \eta \frac{\partial f[\theta(E, x), tr]}{\partial E} \bigg|_{E_k}$$

wherein: $E_k$ represents the set of current values of the parameters of the neural network 29; $E_{k+1}$ represents the set of updated values of the parameters of the neural network 29; f represents the loss function, which depends on a non-linear function $\theta$ implemented by the neural network 29, which in turn depends on the parameters of the neural network 29 and on the data provided as input to the neural network 29 (in this case, the training matrices), the loss function f also depending on the "ground truth" curves.

In practice, at each iteration of the operations referred to in blocks 111-113, the set of current values of the parameters of the neural network 29 during the operations referred to in block 111 is equal to the set of updated values generated by the operations referred to in block 113 of the previous iteration. Furthermore, at the end of the iterations, the neural network 29 was applied to all the training matrices NUM_W.

Figure 20:
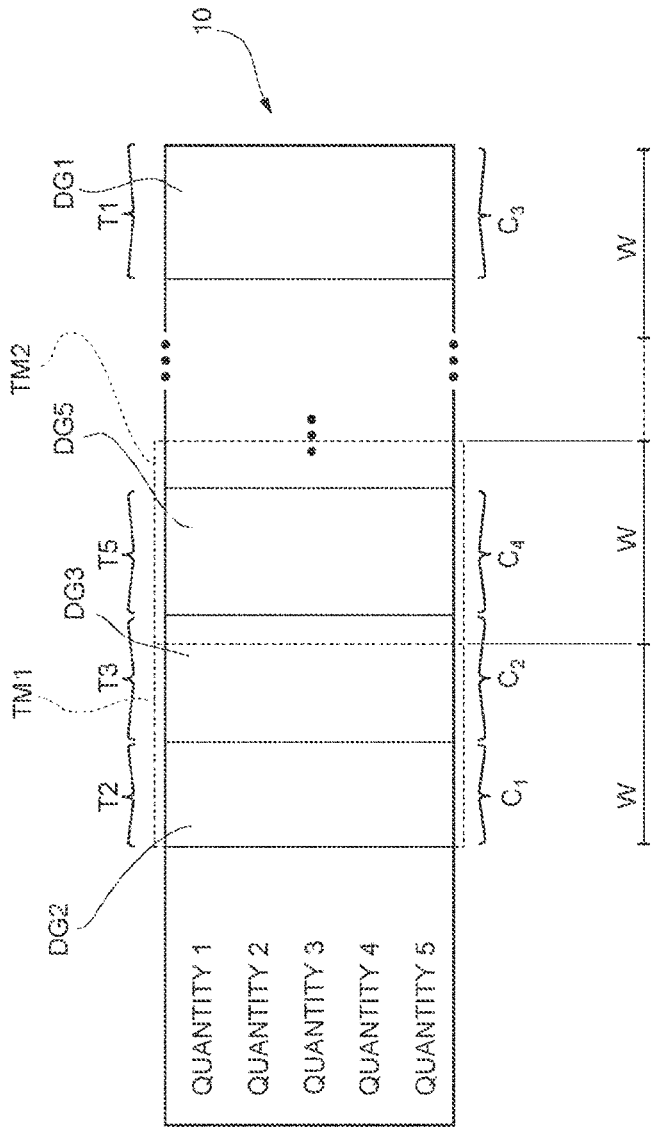

Once the iterations of the operations referred to in blocks 111-113 have been ended, i.e. once the batches have been ended, the computer 12 reshuffles in a pseudo-random manner (block 119) the sequence of the data groups (in a number always equal to L) of the training data structure 10, as shown, for example, in FIG. 20, in which it can be noted that this sequence now begins with the manoeuvres performed in the intervals of time T2, T3 and T5, which belong to the classes $C_1$, $C_2$ and $C_4$, respectively, and ends with the manoeuvre performed during the interval of time T1, which, as mentioned, belongs to class $C_3$.

The operations relative to block 109, block 110, to the iterations of blocks 111-113 and to block 119 define a so-called era; moreover, the computer 12 iterates these operations for a predefined number of eras, at the end of which the training of the neural network 29 is considered as completed.

In particular, thanks to the reshuffling, the composition of the training matrices (still in a number equal to NUM_W and having dimensions still equal to N*W) that are generated during the new execution of the operations referred to in block 109 differs from the previous era. For example, in FIG. 20 it can be noted how the training matrix TM1 now includes the data group DG1 and part of the data group DG3, while the training matrix TM2 now includes part of the data group DG3 and the data group DG5. Consequently, at each era, the computer 12 generates a number NUM_L of corresponding batches of training matrices, by performing the operations referred to in block 110. Thus, the training of the neural network 29 is less dependent on the initial sequence of the data groups within the training data structure 10.

In addition, reshuffling operations involve corresponding modifications of the "ground truth" curves; however, each training matrix remains associated with a corresponding "ground truth" curve.

In greater detail, in each era, the corresponding operations relative to block 109, to block 110, to the iterations of blocks 111-113 and to block 119 are performed in the same manner as described above except that, for each era following the first era, when the neural network 29 is applied to the training matrices of the corresponding first batch, the set of current values of the parameters of the neural network 29 is equal to the set of updated values calculated based on the last batch of training matrices of the previous era. Furthermore, with regard to the last era, the reshuffling referred to in block 119 is not performed.

Once the training is completed, the computer 12 uses the neural network 29 to classify unknown manoeuvres, as explained below, again with reference to FIG. 3.

In detail, the computer 12 acquires (block 120, FIG. 3) an unknown data structure 910, an example of which is shown in FIG. 21, again assuming N=5.

The unknown data structure 910 stores time series of samples of the primary quantities detected by the monitoring system 2 of the helicopter 1 during unknown flights, i.e. flights for which the manoeuvres performed are not known. These time series of samples refer to a succession of instants of time, which are temporally spaced by $\Delta_c$; for each instant of time, the unknown data structure 910 stores a corresponding unknown vector (one shown in FIG. 21, denoted with IV), which has the same form as the training vectors, therefore it includes the samples of the primary quantities relative to the corresponding instant of time. The unknown data structure 910 therefore has a number of rows equal to the number N of primary quantities.

Figure 21:
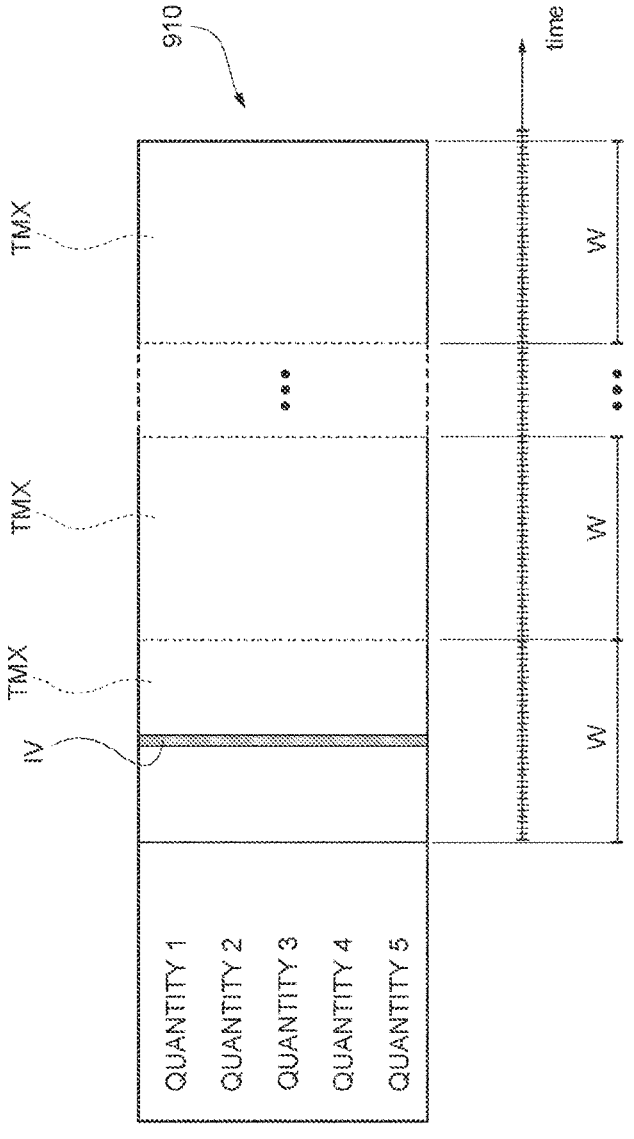

Subsequently, the computer 12 selects (block 121) portions of the unknown data structure 910, which are referred to in the following as the unknown matrices (three shown in FIG. 21, where they are denoted with TMX).

The unknown matrices TMX have the same dimensions as the training matrices (i.e., N*W). Furthermore, without any loss of generality, the unknown matrices TMX are formed by adjacent, non-overlapping portions of the unknown data structure 910.

Figure 22:
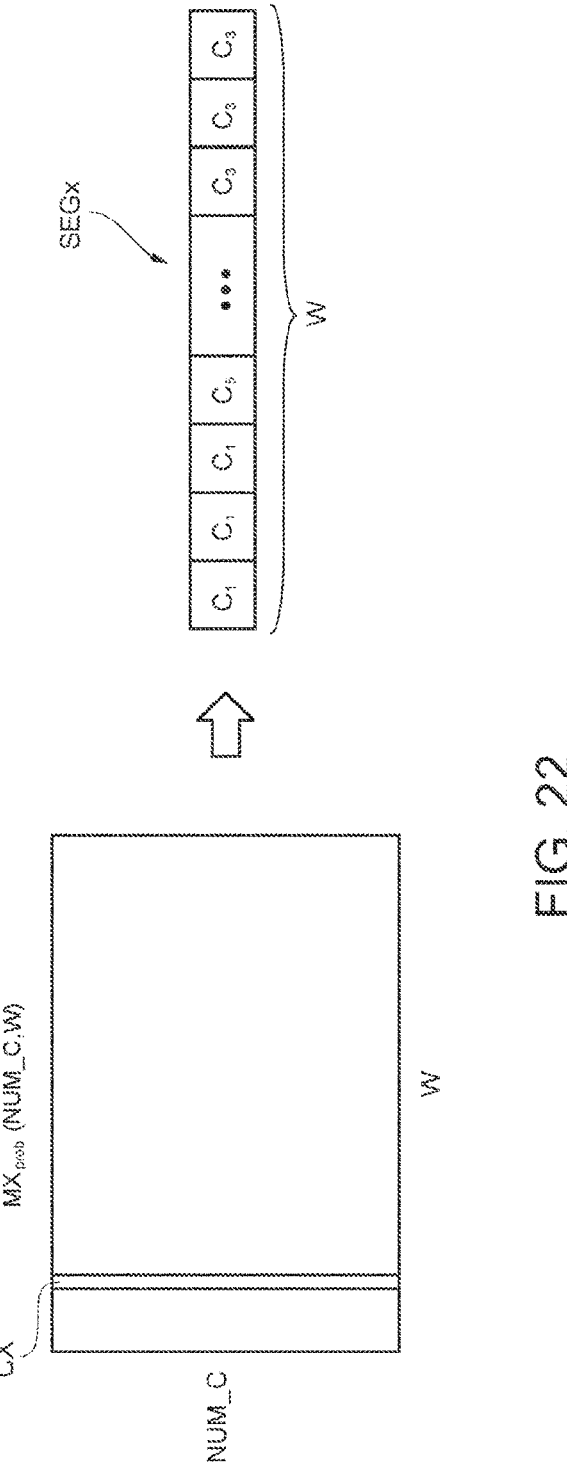

Subsequently, the computer 12 applies (block 122) the neural network 29 to each unknown matrix 910, so as to obtain a corresponding matrix $MX_{prob}$ (NUM_C,W), which comprises, for each unknown vector IV of the unknown matrix TMX, a corresponding vector, as shown for example in FIG. 22, in which a vector denoted with CX is shown.

Each vector of the matrix $MX_{prob}$ (NUM_C,W) is relative to a corresponding unknown vector of the unknown matrix TMX and includes a number of elements equal to NUM_C, each element being equal to an estimate of the probability that, at the instant of time to which the corresponding unknown vector refers, the helicopter 1 performed a manoeuvre belonging to the corresponding class.

Then, on the basis of each matrix $MX_{prob}$ (NUM_C,W), the computer 12 detects (block 123), for each of the unknown vectors, the class to which the manoeuvre performed in the corresponding instant of time belongs, by selecting the class to which the element with the highest probability estimate refers, among the elements of the corresponding vector of the matrix $MX_{prob}$ (NUM_C,W). In this way, the computer 12 generates, for each unknown matrix TMX, a corresponding segmentation vector SEGx (one shown in FIG. 22), which is formed by a number of elements equal to W, each element being referred to a corresponding unknown vector of the unknown matrix TMX and being indicative of the class detected with respect to such corresponding unknown vector.

In practice, each segmentation vector SEGx represents, for each instant of time of an unknown matrix TMX, the class of the manoeuvre performed by the helicopter 1 at that instant of time. A segmentation by classes of each unknown TMX is thus obtained, this segmentation benefiting from the features explained below, with reference to the above-mentioned generic input matrix M.

In detail, the neural network 29 is characterised by the ability to detect so-called "features" of the input matrix M even when these "features" extend over samples of the input matrix M that are very distant from each other, thanks to the presence of "max pooling" operations.

Furthermore, the neural network 29 has an encoder-decoder type structure, in which the encoding stage 30 allows the detection of the presence of features within the input matrix M, while the decoding stage 40 allows the localisation of the detected features, i.e. to determine the position thereof within the input matrix M, in order to allow a correct segmentation.

In addition, the concatenation operations between the encoding stage 30 and the decoding stage 40 make it possible to use the detections made by the encoding stage 30 also in the decoding phase, with a consequent increase in the ability to correctly detect the classes of the manoeuvres.

The advantages that the present method allows to obtain therefore emerge clearly from the previous description.

In particular, the present method allows to accurately detect the classes of the manoeuvres performed at each instant of time corresponding to any unknown vector of the unknown data structure 910, by employing a neural network that does not require the selection of particular features, nor to dimension time windows. These detections can therefore be used reliably, for example to estimate the state of fatigue and therefore the residual fatigue life of the components of an aircraft.

Clearly, changes may be made to the method and system described and shown herein without, however, departing from the scope of the present invention, as defined in the accompanying claims.

For example, the ground truth curves may be different from those described; similarly, the loss function may also be different from the function described.

The training of the neural network may be different; for example, training batches may include different numbers of training matrices than described. It is also possible that, for each iteration, the values of the parameters of the neural network are updated in batches that are different in number and/or dimensions than described.

Furthermore, the same neural network 29 may include a different number of encoding/decoding layers. Each encoding/decoding layer may include a different number of processing steps. Each processing step can furthermore include a different number of filters than described and/or filters of a different type than described.

With regard to "max pooling" operations, they can be replaced by operations of a different type, which nevertheless make it possible to reduce the dimensions of the matrices, such as aggregation operations which make it possible to reduce the dimensions of the starting matrix, such as for example so-called "stride" or "softmax pooling" operations.

Finally, it is possible that some of the operations described are performed in a different order than that described. Moreover, at least some of the operations described can be performed by an entity other than the computer 12.

The invention claimed is:

1. A method implemented by computer for classifying manoeuvres performed by a first aircraft equipped with a monitoring system configured to acquire samples of a number of quantities relative to the flight of the first aircraft, comprising the steps of:

obtaining a data structure including at least one unknown data matrix including a plurality of time series of the samples of said quantities acquired via said monitoring system, said samples being relative to a succession of instants of time;

applying to the unknown data matrix a neural network configured to generate a corresponding probability matrix, said neural network having been trained based on a plurality of classes of manoeuvres and based on a plurality of first training matrices equal to corresponding portions of a training data structure including a sequence of data groups, each data group including corresponding time series of samples of said quantities, the time series of samples of each data group being relative to a corresponding time period in which said first aircraft or one or more second aircrafts that are identical to said first aircraft and equipped with respective monitoring systems have performed a corresponding manoeuvre belonging to a corresponding class among said plurality of classes of manoeuvres, said neural network having also been trained on the basis of curves that are indicative, for each first training matrix, of the classes of the manoeuvres performed by said first aircraft or by said second aircrafts during the acquisition of the data groups of the first training matrix, so that said probability matrix comprises, for each instant of time of said succession of instants of time, a corresponding probability vector including, for each class of said plurality of classes of manoeuvres, a corresponding estimate of the probability that, at said instant of time, the first aircraft performed a manoeuvre belonging to said class; and selecting, for each instant of time of said succession of instants of time, a corresponding class of manoeuvres, based on the probability estimates of the corresponding probability vector.

2. The method according to claim 1, wherein the neural network comprises:

an encoding stage configured to receive the unknown data matrix and including a number of encoding layers arranged in cascade;

a decoding stage comprising a number of decoding layers arranged in cascade;

a bottom layer, interposed between the encoding stage and the decoding stage; and an output stage, arranged downstream of the decoding stage;

and wherein each encoding layer comprises:

one or more respective processing stages arranged in cascade, each of which is configured to store a number of respective filters and to perform convolution operations, based on the respective filters, and subsequent activation and normalisation operations;

a respective reduction stage configured to perform an aggregation operation and arranged downstream of said respective processing stages;

and wherein the bottom layer comprises:

one or more respective processing stages arranged in cascade, each of which is configured to store a number of respective filters and to perform convolution operations, based on the respective filters, and subsequent activation and normalisation operations;

and wherein each decoding layer comprises:

a respective upsampling stage configured to perform upsampling operations;

one or more respective processing stages arranged downstream of said respective upsampling stage, each of which is configured to store a number of respective filters and to perform convolution operations, based on the respective filters, and subsequent activation and normalisation operations.

3. The method according to claim 2, wherein the reduction stages of the encoding layers are configured to perform max pooling operations.

4. The method according to claim 2, wherein the output stage comprises a respective processing stage configured to store a number of respective filters equal to the number of said classes of manoeuvres and to generate said probability matrix by performing convolution operations, based on the respective filters, and subsequent activation operations.

5. The method according to claim 2, wherein the unknown data matrix and the first training matrices have a first dimension equal to the number of quantities, a second dimension equal to a predefined number and a unitary third dimension; and wherein each encoding layer is configured to implement a reduction of the second dimension and an increase of the third dimension; and wherein said one or more processing stages of the bottom layer are configured to perform convolution operations which leave the first and second dimension unchanged and increase the third dimension; and wherein each decoding layer is configured to implement an increase of the second dimension and a reduction of the third dimension.

6. The method according to claim 5, wherein each encoding layer comprises:

a respective first processing stage configured to generate a corresponding first three-dimensional encoding matrix;

a respective second processing stage configured to generate a corresponding second three-dimensional encoding matrix having the same dimensions as the corresponding first three-dimensional encoding matrix;

and wherein the reduction stage of each encoding layer is configured to receive the second three-dimensional encoding matrix generated by the corresponding second processing stage.

7. The method according to claim 6, wherein the decoding layers are in a number equal to the encoding layers; and wherein each upsampling stage is configured to increase the second dimension and is configured to generate a respective first three-dimensional decoding matrix; and wherein each decoding layer comprises:

a respective first processing stage arranged downstream of the corresponding upsampling stage and configured to generate a respective second three-dimensional decoding matrix having a third dimension lower than the third dimension of the corresponding first three-dimensional decoding matrix;

a respective concatenation stage configured to generate a corresponding third three-dimensional decoding matrix by concatenation of the corresponding second three-dimensional decoding matrix with the corresponding second three-dimensional encoding matrix, said corresponding third three-dimensional decoding matrix having the same third dimension as the corresponding first three-dimensional decoding matrix;

a respective second processing stage arranged downstream of the corresponding concatenation stage and configured to generate a respective fourth three-dimensional decoding matrix having a reduced third dimension with respect to the third dimension of the corresponding third three-dimensional decoding matrix; and a respective third processing stage arranged downstream of the corresponding second processing stage and configured to generate a respective fifth three-dimensional decoding matrix having the same dimensions as the corresponding fourth three-dimensional decoding matrix.

8. The method according to claim 7, wherein the output stage further comprises a reshaping stage configured to receive the fifth three-dimensional decoding matrix generated by the last decoding layer (44), which is formed by a plurality of respective two-dimensional matrices, and to generate a two-dimensional output matrix by stacking said two-dimensional matrices along the first dimension; and wherein the processing stage of the output stage is configured to operate on the two-dimensional output matrix.

9. The method according to claim 1, wherein the neural network is defined by a plurality of parameters, which have been determined by training on the basis of said first training matrices, of said curves indicative of the classes of the manoeuvres performed and of a loss function.

10. The method according to claim 9, wherein said parameters have been determined by performing the steps of:

assigning a first set of values to the parameters of the neural network; and then generating a number of first training batches, each first training batch including a number of respective first training matrices;

said method also comprising, for each batch among the first training batches, performing the steps of:

applying the neural network to each first training matrix of the batch, so as to generate a corresponding training probability matrix; and then updating the values of the parameters of the neural network on the basis of said loss function, of the training probability matrices relative to the first training matrices of the batch and of said curves that are indicative, for each first training matrix of the batch, of the classes of the manoeuvres performed by said first aircraft or by said second aircraft during the acquisition of the data groups of the first training matrix.

11. The method according to claim 10, further comprising performing at least once the steps of:

modifying the sequence of the data groups of the training data structure and then selecting a plurality of second training matrices starting from the training data structure with modified sequence of the data groups;

generating a number of second training batches, each second training batch including a number of respective second training matrices; and for each batch among the second training batches, applying the neural network to each second training matrix of the batch, so as to generate a corresponding training probability matrix, and then updating the values of the parameters of the neural network on the basis of said loss function, of the training probability matrices relative to the second training matrices of the batch and of curves that are indicative, for each second training matrix of the batch, of the classes of the manoeuvres performed by said first aircraft or by said second aircrafts during the acquisition of the data groups of the second training matrix.

12. A system, comprising:

one or more processing devices; and one or more memory devices communicatively coupled to the one or more processing devices and having stored thereon machine-readable instructions that, when executed, cause the one or more processing devices to:

obtain a data structure including at least one unknown data matrix including a plurality of time series of the samples of said quantities acquired via said monitoring system, said samples being relative to a succession of instants of time;

apply to the unknown data matrix a neural network configured to generate a corresponding probability matrix, said neural network having been trained based on a plurality of classes of manoeuvres and based on a plurality of first training matrices equal to corresponding portions of a training data structure including a sequence of data groups, each data group including corresponding time series of samples of said quantities, the time series of samples of each data group being relative to a corresponding time period in which said first aircraft or one or more second aircrafts that are identical to said first aircraft and equipped with respective monitoring systems have performed a corresponding manoeuvre belonging to a corresponding class among said plurality of classes of manoeuvres, said neural network having also been trained on the basis of curves that are indicative, for each first training matrix, of the classes of the manoeuvres performed by said first aircraft or by said second aircrafts during the acquisition of the data groups of the first training matrix, so that said probability matrix comprises, for each instant of time of said succession of instants of time, a corresponding probability vector including, for each class of said plurality of classes of manoeuvres, a corresponding estimate of the probability that, at said instant of time, the first aircraft performed a manoeuvre belonging to said class; and select, for each instant of time of said succession of instants of time, a corresponding class of manoeuvres, based on the probability estimates of the corresponding probability vector.

13. A non-transitory computer readable medium having stored thereon machine-readable instructions that, when executed, cause a computer to:

obtain a data structure including at least one unknown data matrix including a plurality of time series of the samples of said quantities acquired via said monitoring system, said samples being relative to a succession of instants of time;

apply to the unknown data matrix a neural network configured to generate a corresponding probability matrix, said neural network having been trained based on a plurality of classes of manoeuvres and based on a plurality of first training matrices equal to corresponding portions of a training data structure including a sequence of data groups, each data group including corresponding time series of samples of said quantities, the time series of samples of each data group being relative to a corresponding time period in which said first aircraft or one or more second aircrafts that are identical to said first aircraft and equipped with respective monitoring systems have performed a corresponding manoeuvre belonging to a corresponding class among said plurality of classes of manoeuvres, said neural network having also been trained on the basis of curves that are indicative, for each first training matrix, of the classes of the manoeuvres performed by said first aircraft or by said second aircrafts during the acquisition of the data groups of the first training matrix, so that said probability matrix comprises, for each instant of time of said succession of instants of time, a corresponding probability vector including, for each class of said plurality of classes of manoeuvres, a corresponding estimate of the probability that, at said instant of time, the first aircraft performed a manoeuvre belonging to said class; and select, for each instant of time of said succession of instants of time, a corresponding class of manoeuvres, based on the probability estimates of the corresponding probability vector.

14. The method according to claim 1, further comprising the step of: generating one or more estimation parameters for a residual life time of one or more components of the first aircraft based on the selected corresponding class of manoeuvres.

15. The system of claim 12, wherein the one or more memory devices have stored thereon machine-readable instructions that, when executed, cause the one or more processing devices to: generate one or more estimation parameters for a residual life time of one or more components of the first aircraft based on the selected corresponding class of manoeuvres.

16. The non-transitory computer readable medium of claim 13, having stored thereon machine-readable instructions that, when executed, cause the computer to: generate one or more estimation parameters for a residual life time of one or more components of the first aircraft based on the selected corresponding class of manoeuvres.

* * * * *